United States Patent
Wu et al.

(10) Patent No.: US 11,764,624 B2
(45) Date of Patent: Sep. 19, 2023

(54) WIRELESS CHARGING DEVICE, AUTOMATIC ALIGNMENT METHOD, AND CHARGING DOCK

(71) Applicant: Huawei Digital Power Technologies Co., Ltd., Shenzhen (CN)

(72) Inventors: Baoshan Wu, Shenzhen (CN); Donghao Wu, Shenzhen (CN)

(73) Assignee: Huawei Digital Power Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/581,597

(22) Filed: Jan. 21, 2022

(65) Prior Publication Data
US 2022/0231547 A1    Jul. 21, 2022

(30) Foreign Application Priority Data
Jan. 21, 2021  (CN) .......................... 202110082508.0

(51) Int. Cl.
| H02J 50/90 | (2016.01) |
| H02J 50/12 | (2016.01) |
| H02J 50/40 | (2016.01) |
| H02J 50/60 | (2016.01) |

(52) U.S. Cl.
CPC .............. *H02J 50/90* (2016.02); *H02J 50/12* (2016.02); *H02J 50/40* (2016.02); *H02J 50/60* (2016.02)

(58) Field of Classification Search
CPC .. H02J 50/90; H02J 50/12; H02J 50/40; H02J 50/60; H02J 50/005; H02J 7/02; H02J 50/70
See application file for complete search history.

(56) References Cited

U.S. PATENT DOCUMENTS

| 9,660,487 | B1* | 5/2017 | Mu ......................... H02J 50/10 |
| 11,228,199 | B2* | 1/2022 | Yang ....................... H02J 50/10 |
| 2009/0079269 | A1* | 3/2009 | Jin .......................... H02J 50/12 |
| | | | 307/104 |

(Continued)

FOREIGN PATENT DOCUMENTS

| CN | 109904938 A | 6/2019 |
| CN | 111373629 A | 7/2020 |

(Continued)

*Primary Examiner* — Jared Fureman
*Assistant Examiner* — Michael J Warmflash
(74) *Attorney, Agent, or Firm* — Leydig, Voit & Mayer, Ltd.

(57) ABSTRACT

A wireless charging device is provided in this application, which includes: a transmitter coil, a controller, and at least two detection coils. The at least two detection coils are located on a side of a plane on which the transmitter coil is located, and a plane on which the detection coils are located is parallel to the plane on which the transmitter coil is located. The controller is configured to: separately control the at least two detection coils to sequentially connect to an excitation power source, obtain parameters of the detection coils connected to the excitation power source, and control, based on a value difference between the parameters of the at least two detection coils, the transmitter coil to move, so that the transmitter coil aligns with a receiver coil in an electronic device. Furthermore, an automatic alignment method and a charging dock are also provided in this application.

17 Claims, 16 Drawing Sheets

(56) References Cited

U.S. PATENT DOCUMENTS

| | | | | |
|---|---|---|---|---|
| 2009/0153098 A1* | 6/2009 | Toya | ............... | H02J 50/10 |
| | | | | 320/108 |
| 2010/0270970 A1* | 10/2010 | Toya | ............... | H02J 50/80 |
| | | | | 320/108 |
| 2010/0315038 A1* | 12/2010 | Terao | ............. | H02J 50/60 |
| | | | | 320/108 |
| 2010/0315039 A1* | 12/2010 | Terao | ............. | H02J 50/90 |
| | | | | 320/108 |
| 2012/0280651 A1* | 11/2012 | Toya | ............... | H02J 50/60 |
| | | | | 320/108 |
| 2013/0009596 A1* | 1/2013 | Toya | ............... | H02J 50/60 |
| | | | | 320/108 |
| 2019/0020226 A1* | 1/2019 | Huang | ............ | H02J 50/10 |
| 2019/0044382 A1* | 2/2019 | Wang | ............. | H02J 50/90 |
| 2019/0348868 A1* | 11/2019 | Lee | ................ | H02J 50/90 |
| 2020/0203995 A1* | 6/2020 | Osada | ............ | H02J 50/90 |

FOREIGN PATENT DOCUMENTS

| | | | |
|---|---|---|---|
| CN | 111512517 | A | 8/2020 |
| CN | 111668893 | A | 9/2020 |
| CN | 211790962 | U | 10/2020 |
| CN | 112260411 | A | 1/2021 |
| JP | 2009081945 | A | 4/2009 |
| JP | 2009247194 | A | 10/2009 |
| JP | 2013135518 | A | 7/2013 |
| JP | 2019103278 | A | 6/2019 |
| WO | 2008032746 | A1 | 3/2008 |

* cited by examiner

WIRELESS CHARGING DEVICE, AUTOMATIC ALIGNMENT METHOD, AND CHARGING DOCK

CROSS-REFERENCE TO RELATED APPLICATION

This application claims priority to Chinese Patent Application No. 202110082508.0, filed on Jan. 21, 2021, which is hereby incorporated by reference in its entirety.

TECHNICAL FIELD

Embodiments of this application relate to the field of wireless charging technologies, and in particular, to a wireless charging device, an automatic alignment method, and a charging dock.

BACKGROUND

In a wireless charging technology (WCT), conductive media such as electric fields, magnetic fields, microwaves, or lasers are used to implement wireless transmission of electric energy. Due to advantages such as wire-free limitation and plug-free, the wireless charging technology is increasingly widely applied to electronic devices. Currently, more electronic devices are wirelessly charged by wireless charging devices. For example, the electronic devices may be mobile phones or wearable devices. The wireless charging devices include transmitter coils, and the electronic devices include receiver coils.

Currently, in the wireless charging technology, energy is transmitted through magnetic field coupling between a transmitter coil and a receiver coil, and the transmitter coil and the receiver coil need to be located within a space distance. For example, when an electronic device is a mobile phone or a wearable device, if the electronic device is placed on a wireless charging device, a position of a receiver coil may not align with a position of a transmitter coil. Consequently, the electronic device cannot be charged or charging efficiency is low.

SUMMARY

To resolve the foregoing technical problem, embodiments of this application provide a wireless charging device, an automatic alignment method, and a charging dock to implement automatic alignment of a transmitter coil in the wireless charging device and a receiver coil in an electronic device, thereby improving wireless charging flexibility.

An embodiment of this application provides a wireless charging device. An implementation type of the wireless charging device is not specifically limited, for example, may be a wireless charger, a one-to-one charger, or a one-to-many charger. The wireless charging device is configured to wirelessly charge an electronic device. The electronic device may be a device that can be wirelessly charged, such as a mobile phone, a tablet, or a watch. The wireless charging device includes: a transmitter coil, a controller, and at least two detection coils; the at least two detection coils are located on a side of a plane on which the transmitter coil is located, and a plane on which the detection coils are located is parallel to the plane on which the transmitter coil is located; and the controller separately controls the at least two detection coils to sequentially connect to an excitation power source, obtains parameters of the detection coils connected to the excitation power source, and controls, based on a value difference between the parameters of the at least two detection coils, the transmitter coil to move, so that the transmitter coil aligns with a receiver coil in the electronic device.

When a position deviation between the transmitter coil and the receiver coil in the electronic device is too large to communicate with each other, the controller controls, by using parameters of a plurality of detection coils, the transmitter coil to move to align with the receiver coil. The plurality of detection coils are disposed, a sum of areas covered by the plurality of detection coils is greater than an area covered by the transmitter coil, and a placement position of the electronic device is detected by using the parameters of the detection coils. Therefore, a placement range of the electronic device that may be accepted by the wireless charging device is larger. Because the detection coils in this embodiment of this application are sequentially connected to the excitation power source, electromagnetic interference caused by simultaneous connections to the excitation power source can be avoided, and inaccurate obtained parameters of the detection coils caused by the electromagnetic interference can be avoided. Because the plane on which the detection coils are located is parallel to the plane on which the transmitter coil is located, the obtained parameters of the detection coils facilitate comparison. In this way, the transmitter coil can align with the receiver coil more accurately based on the parameters of the detection coils. A case in which the obtained parameters cannot be compared together due to non-parallel arrangement is avoided. The wireless charging device provided in this embodiment of this application can implement automatic alignment. Therefore, when the electronic device is wirelessly charged, even if there is a deviation between the receiver coil and the transmitter coil at a position at which the electronic device is placed, the controller can still control, based on the parameters of the detection coils, the transmitter coil to move, so as to implement automatic alignment of the transmitter coil and the receiver coil, thereby improving charging flexibility and wireless charging experience of a user.

In a possible implementation, the at least two detection coils may be symmetrically arranged about a central axis of the transmitter coil in an upper direction of the plane on which the transmitter coil is located. The upper direction is the side facing the electronic device. Because the detection coils are disposed on the side closer to the electronic device, it is easier to detect a position of the receiver coil. In this way, a case in which detection is inaccurate because the detection coils are disposed on a side far away from the electronic device is avoided. The detection coils are symmetrically arranged about the central axis of the transmitter coil on the upper direction of the plane on which the transmitter coil is located. A purpose of uniform and symmetrical arrangement is to enable the detection coils to cover a larger range and avoid a case in which the electronic device cannot be detected due to a small detection range.

In a possible implementation, the parameters of the detection coil may include self-inductances of the detection coils. The controller specifically obtains self-inductances of all the detection coils, and controls, based on value differences between the self-inductances of all the detection coils, the transmitter coil to move toward a detection coil with a largest self-inductance among the at least two detection coils, to implement alignment of the transmitter coil and the receiver coil. Because a shorter distance between a detection coil and the receiver coil in the electronic device indicates a larger self-inductance of the detection coil, the self-inductances of the detection coils may be used to determine a detection coil closest to the receiver coil, so as to determine the position of the receiver coil and move the transmitter coil to the position corresponding to the receiver coil.

In a possible implementation, the parameters of the detection coils may include self-inductances and alternating current resistances of the detection coils. The controller obtains self-inductances and alternating current resistances of all the detection coils, and controls, based on value differences between the self-inductances and the alternating current resistances of all the detection coils, the transmitter coil to move toward a detection coil with a largest product of a self-inductance and an alternating current resistance among the at least two detection coils, to implement alignment of the transmitter coil and the receiver coil. A product of a self-inductance and an alternating current resistance of a detection coil may indicate a distance between the detection coil and the receiver coil in the electronic device, and a larger product of the self-inductance and the alternating current resistance indicates a shorter distance between the detection coil and the receiver coil. Therefore, the transmitter coil can be moved to a position corresponding to the detection coil.

In a possible implementation, when the detection coils have a function of communicating with the receiver coil, the parameters of the detection coils are communication results. The communication results are used to indicate whether the detection coils successfully communicate with the receiver coil. The controller obtains communication results between all the detection coils and the receiver coil, and controls, based on the communication results between all the detection coils and the receiver coil, the transmitter coil to move toward a detection coil corresponding to a communication result being a success. The sum of the areas covered by the plurality of detection coils is greater than the area covered by the transmitter coil; and when the transmitter coil cannot communicate with the receiver coil, another detection coil may communicate with the receiver coil. Therefore, the detection coil successfully communicating with the receiver coil may be used to control the transmitter coil to move to a position of the detection coil implementing communication, so that the transmitter coil aligns with the receiver coil in the electronic device.

A quantity of detection coils is not specifically limited in this embodiment of this application, and may be set by a person skilled in the art based on an actual condition, for example, may be set to two, three, four, or more detection coils. To make a range covered by the detection coils bigger and more uniform, the quantity of detection coils may be set based on a size of the transmitter coil and a movable range that can be covered, so that the detection coils cover the range corresponding to the transmitter coil as evenly as possible.

In a possible implementation, the at least two detection coils are symmetrically arranged about the central axis of the transmitter coil. There are four detection coils, and shapes and sizes of the four detection coils are consistent. A shape and a size of each detection coil are not limited in this embodiment of this application either. For ease of detection and simplification of a process, it may be set that sizes and shapes of all detection coils are consistent, and the shapes may be circles or regular polygons. This implementation is particularly applicable to a case in which the detection coils are fastened. For a case in which detection coils can be moved, a larger quantity of detection coils may be set, and the detection coils are not necessarily symmetrically arranged about a central axis of the transmitter coil.

In a possible implementation, any two neighboring detection coils may be in contact, that is, a contact portion has no gap; or any two neighboring detection coils may be spaced by a preset distance. When two neighboring detection coils are in contact, a charging range that can be covered by the transmitter coil may be small, but a detection dead zone between the detection coils is also smaller, and movement control over the transmitter coil is easier. When two neighboring detection coils are spaced by the preset distance, that is, a gap exists between the two neighboring detection coils, the charging range that can be covered by the transmitter coil can be expanded, but the detection dead zone between the detection coils may also be larger, and movement control over the transmitter coil is more complex.

In a possible implementation, a quantity of turns of the detection coils is not limited in this embodiment of this application, and may be one or more turns. To be specific, the detection coils include at least one turn of coil of a preset shape. Disposing one turn of coil can reduce a material and facilitate a layout. The detection coils may be winding coils, or may be coils in forms of printed circuit boards (PCBs).

In a possible implementation, the wireless charging device further includes a plurality of switching circuits. The plurality of switching circuits are connected between the excitation power source and the at least two detection coils. The controller controls switching actions in the plurality of switching circuits, so that the at least two detection coils are sequentially connected to the excitation power source to switch between the detection coils. The plurality of switching circuits include at least a switch module. A specific implementation of the switch module is not limited in this embodiment of this application, for example, may be a controllable switch. A quantity of switch modules may be equal to a quantity of detection coils, in other words, the switch modules are in a one-to-one correspondence with the detection coils.

In a possible implementation, whether the detection coils can move is not specifically limited in this embodiment of this application. For example, the at least two detection coils may move with the transmitter coil; or the at least two detection coils may remain stationary, that is, positions are constant. When the detection coils remain stationary, because the detection coils are fastened, movement space of the detection coils does not need to be considered, thereby facilitating expansion of a detection region and implementing a charging plane with a larger range. This is particularly applicable to a scenario in which one wireless charging device wirelessly charges a plurality of devices. When the at least two detection coils move with the transmitter coil, installation manners of the detection coils and impact on movable space of the transmitter coil need to be considered.

In a possible implementation, as described above, movement of the transmitter coil is controlled by using the parameters of the detection coils. When the transmitter coil moves to a position at which the transmitter coil can communicate with the receiver coil, the controller may further control, by using a wireless charging parameter, the transmitter coil to move. In this way, the transmitter coil can align with the receiver coil more precisely. In other words, controlling, by using the parameters of the detection coils, the transmitter coil to move is rough adjustment alignment, and alignment performed by using the wireless charging parameter is fine adjustment alignment. The controller obtains at least one of the following parameters of the wireless charging device: working frequency, a self-inductance of the transmitter coil, an alternating current resistance of the transmitter coil, a current of the transmitter coil, or an input voltage of the transmitter coil; and controls, based on the at least one parameter, the transmitter coil to move, so that the transmitter coil further aligns with the receiver coil in the electronic device.

In a possible implementation, the controller is further configured to: obtain a charging parameter, and control, based on the charging parameter, the transmitter coil to move, so that the transmitter coil further aligns with the receiver coil in the electronic device; and the charging parameter may further include: charging efficiency, a charging voltage, a mutual inductance between the transmitter coil and the receiver coil, or a coupling parameter between the transmitter coil and the receiver coil.

In a possible implementation, when the electronic device includes an auxiliary coil, the charging parameter further includes a mutual inductance between the transmitter coil and the auxiliary coil or a coupling parameter between the transmitter coil and the auxiliary coil. The transmitter coil further aligns with the receiver coil in the electronic device by using the auxiliary coil.

In a possible implementation, to implement more precise alignment and perform charging more efficiently, the wireless charging device provided in this embodiment of this application may further determine a metal foreign matter by using a Q value of each detection coil. To be specific, the controller obtains the Q value of the detection coil. When the Q value of the detection coil is less than or equal to a preset Q threshold, the controller determines that a metal foreign matter exists between the transmitter coil and the receiver coil. To prevent the metal foreign matter from affecting wireless charging, the metal foreign matter may be removed first before wireless charging is performed.

In a possible implementation, the wireless charging device further includes an alignment mechanism. The controller controls the alignment mechanism to drive the transmitter coil, so that the transmitter coil aligns with the receiver coil. The controller is further configured to control the transmitter coil to return an original position after the wireless charging device finishes charging the electronic device. A purpose of controlling the transmitter coil to return to the original position is to prepare for a next time of wireless charging.

On the basis of the wireless charging device provided in the foregoing embodiment, an embodiment of this application further provides a wireless charging method, applied to the wireless charging device. Advantages of the foregoing embodiments of the wireless charging device are applicable to the following method, and therefore, are not described again. The wireless charging device includes: a transmitter coil, a controller, and at least two detection coils; and the at least two detection coils are located on a side of a plane on which the transmitter coil is located, and a plane on which the detection coils are located is parallel to the plane on which the transmitter coil is located. The method includes: separately controlling the at least two detection coils to sequentially connect to an excitation power source, obtaining parameters of the detection coils connected to the excitation power source, and controlling, based on a value difference between the parameters of the at least two detection coils, the transmitter coil to move, so that the transmitter coil aligns with a receiver coil in the electronic device.

In a possible implementation, the parameters include self-inductances. The controlling, based on a value difference between the parameters of the at least two detection coils, the transmitter coil to move specifically includes: controlling, based on value differences between the self-inductances of all the detection coils, the transmitter coil to move toward a detection coil with a largest self-inductance among the at least two detection coils.

In a possible implementation, the parameters include self-inductances and alternating current resistances. The controlling, based on a value difference between the parameters of the at least two detection coils, the transmitter coil to move specifically includes: controlling, based on value differences between the self-inductances and the alternating current resistances of all the detection coils, the transmitter coil to move toward a detection coil with a largest product of a self-inductance and an alternating current resistance among the at least two detection coils.

In a possible implementation, the parameters include communication results, and the communication results are used to indicate whether the detection coils successfully communicate with the receiver coil. The controlling, based on the parameters of the detection coils, the transmitter coil to move specifically includes: controlling, based on the communication results between all the detection coils and the receiver coil, the transmitter coil to move toward a detection coil corresponding to a communication result being a success.

In a possible implementation, the controller is further configured to: obtain at least one of the following parameters of the wireless charging device: working frequency, a self-inductance of the transmitter coil, an alternating current resistance of the transmitter coil, a current of the transmitter coil, or an input voltage of the transmitter coil; and control, based on the at least one parameter, the transmitter coil to move, so that the transmitter coil further aligns with the receiver coil in the electronic device.

In a possible implementation, the controller obtains a charging parameter, and controls, based on the charging parameter, the transmitter coil to move, so that the transmitter coil further aligns with the receiver coil in the electronic device; and the charging parameter includes: charging efficiency, a charging voltage, a mutual inductance between the transmitter coil and the receiver coil, or a coupling parameter between the transmitter coil and the receiver coil.

In a possible implementation, the electronic device includes an auxiliary coil, and the charging parameter further includes a mutual inductance between the transmitter coil and the auxiliary coil or a coupling parameter between the transmitter coil and the auxiliary coil. The transmitter coil further aligns with the receiver coil in the electronic device by using the auxiliary coil.

In a possible implementation, the controller obtains the Q value of the detection coil. When the Q value of the detection coil is less than or equal to a preset Q threshold, the controller determines that a metal foreign matter exists between the transmitter coil and the receiver coil. To prevent the metal foreign matter from affecting wireless charging, the metal foreign matter may be removed first before wireless charging is performed.

In a possible implementation, the controller controls an alignment mechanism to drive the transmitter coil, so that the transmitter coil aligns with the receiver coil; and controls the transmitter coil to return an original position after the wireless charging device finishes charging the electronic device.

On the basis of the wireless charging device provided in the foregoing embodiments, correspondingly, an embodiment of this application further provides a wireless charging dock to wirelessly charge an electronic device. The foregoing described embodiments of the wireless charging device may correspond to the dock. In addition, advantages of the foregoing implementations are applicable to the dock, and therefore, are not described again. The wireless charging dock includes: a power interface, a resonant network, an inverter circuit, a controller, a detection coil, and a transmitter coil chassis. The power interface is configured to connect to a direct current transmitted by an adapter. The resonant network includes a resonant capacitor and a transmitter coil. The transmitter coil chassis is configured to carry the transmitter coil. An input terminal of the inverter circuit is configured to connect to the power interface, and an output terminal of the inverter circuit is configured to connect to the resonant network. The at least two detection coils are located on a side of a plane on which the transmitter coil is located, and a plane on which the detection coils are located is parallel to the plane on which the transmitter coil is located. The controller separately controls the at least two detection coils to sequentially connect to an excitation power source, obtains parameters of the detection coils connected to the excitation power source, and controls, based on a value difference between the parameters of the at least two detection coils, the transmitter coil to move, so that the transmitter coil aligns with a receiver coil in the electronic device.

For example, the wireless charging dock is a charging disk or a three-dimensional charging cradle. A specific geometric shape of the wireless charging dock is not specifically limited in this embodiment of this application. When the wireless charging dock charges the electronic device, the wireless charging dock usually may be parallel to a horizontal plane, and the electronic device is placed on the wireless charging dock. In addition, when the wireless charging dock is vertical to the horizontal plane, a plane on which the electronic device is located needs to be parallel to a plane on which the wireless charging dock is located. In this way, the transmitter coil is better coupled to the receiver coil.

In a possible implementation, the parameters include self-inductances. The controlling, based on a value difference between the parameters of the at least two detection coils, the transmitter coil to move specifically includes: controlling, based on value differences between the self-inductances of all the detection coils, the transmitter coil to move toward a detection coil with a largest self-inductance among the at least two detection coils.

In a possible implementation, the parameters include self-inductances and alternating current resistances. The controlling, based on a value difference between the parameters of the at least two detection coils, the transmitter coil to move specifically includes: controlling, based on value differences between the self-inductances and the alternating current resistances of all the detection coils, the transmitter coil to move toward a detection coil with a largest product of a self-inductance and an alternating current resistance among the at least two detection coils.

In a possible implementation, the parameters include communication results, and the communication results are used to indicate whether the detection coils successfully communicate with the receiver coil. The controlling, based on the parameters of the detection coils, the transmitter coil to move specifically includes: controlling, based on the communication results between all the detection coils and the receiver coil, the transmitter coil to move toward a detection coil corresponding to a communication result being a success.

In a possible implementation, the controller obtains at least one of the following parameters of the wireless charging device: working frequency, a self-inductance of the transmitter coil, an alternating current resistance of the transmitter coil, a current of the transmitter coil, or an input voltage of the transmitter coil; and controls, based on the at least one parameter, the transmitter coil to move, so that the transmitter coil further aligns with the receiver coil in the electronic device.

In a possible implementation, the controller obtains a charging parameter, and controls, based on the charging parameter, the transmitter coil to move, so that the transmitter coil further aligns with the receiver coil in the electronic device; and the charging parameter includes: charging efficiency, a charging voltage, a mutual inductance between the transmitter coil and the receiver coil, or a coupling parameter between the transmitter coil and the receiver coil.

In a possible implementation, the electronic device includes an auxiliary coil, and the charging parameter further includes a mutual inductance between the transmitter coil and the auxiliary coil or a coupling parameter between the transmitter coil and the auxiliary coil. The transmitter coil further aligns with the receiver coil in the electronic device by using the auxiliary coil.

In a possible implementation, the controller obtains the Q value of the detection coil. When the Q value of the detection coil is less than or equal to a preset Q threshold, the controller determines that a metal foreign matter exists between the transmitter coil and the receiver coil. To prevent the metal foreign matter from affecting wireless charging, the metal foreign matter may be removed first before wireless charging is performed.

In a possible implementation, the controller controls an alignment mechanism to drive the transmitter coil, so that the transmitter coil aligns with the receiver coil; and controls the transmitter coil to return an original position after the wireless charging device finishes charging the electronic device.

Compared with an existing technology, the technical solutions provided in the embodiments of this application have the following advantages:

The wireless charging device provided in the embodiments of this application is provided with a plurality of detection coils. When a position deviation between the transmitter coil and the receiver coil in the electronic device is too large to communicate with each other, the controller controls, by using parameters of the plurality of detection coils, the transmitter coil to move to align with the receiver coil. The plurality of detection coils are disposed, a sum of areas covered by the plurality of detection coils is greater than an area covered by the transmitter coil, and a placement position of the electronic device is detected by using the parameters of the detection coils. Therefore, a placement range of the electronic device that may be accepted by the wireless charging device is larger. Specifically, the controller may control all the detection coils to sequentially connect to the excitation power source, and sequentially obtains the parameters of the detection coils connected to the excitation power source, thereby avoiding electromagnetic interference of the detection coils caused by simultaneous connections of all the detection coils to the excitation power source, and avoiding that the obtained parameters of the detection coils are inaccurate due to the electromagnetic interference. In addition, the plane on which the detection coils are located is parallel to the plane on which the transmitter coil is located, and the parameters of all the detection coils are obtained in a same condition, thereby facilitating comparison between the parameters of all the detection coils. The controller controls, based on the parameters of the detection coils, the transmitter coil to move, so that the transmitter coil aligns with the receiver coil in the electronic device. The wireless charging device provided in this embodiment of this application can implement automatic alignment. Therefore, when the electronic device is wirelessly charged, even if there is a deviation between the receiver coil and the transmitter coil at a position at which the electronic device is placed, the controller can still control, based on the parameters of the detection coils, the transmitter coil to move, so as to implement automatic alignment of the transmitter coil and the receiver coil, thereby improving charging flexibility and wireless charging experience of a user.

DESCRIPTION OF EMBODIMENTS

Figure 1:
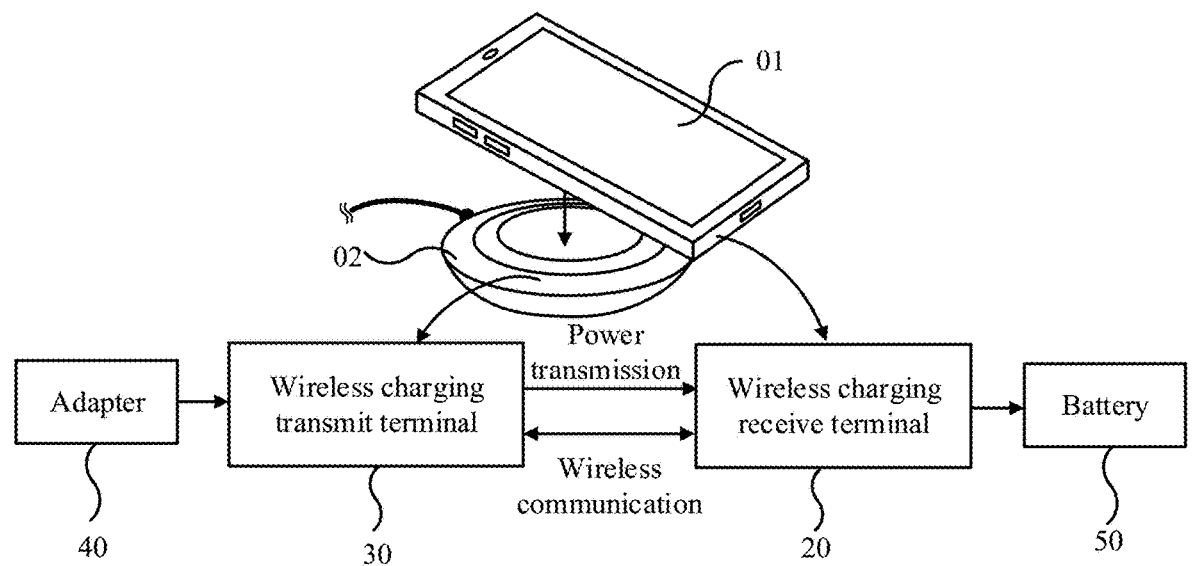
FIG. 1 is a schematic diagram of a wireless charging system according to an embodiment of this application.

Terms "first" and "second" in the following descriptions are only used for descriptive purposes, and cannot be understood as indicating or implying relative importance or implicitly indicating quantities of indicated technical features. Therefore, a feature limited by "first" or "second" may explicitly or implicitly include one or more features. In the description of embodiments of this application, unless otherwise stated, "a plurality of" means two or more than two.

In addition, in the embodiments of this application, the directional terms such as "upper" and "lower" may include but are not limited to the directions defined relative to the schematic placement of the components in the drawings. It should be understood that these directional terms may be relative concepts, are used for relative descriptions and clarifications, and may be changed accordingly based on changes in placement orientations of the components in the accompanying drawings.

In this application, unless otherwise expressly specified and limited, the term "connection" should be understood in a broad sense. For example, "connection" may be a fixed connection, a detachable connection or an integral connection; and may be a direct connection or an indirect connection through an intermediate medium. In addition, the term "coupling" may be a manner of implementing an electrical connection for signal transmission. The "coupling" may be a direct electrical connection, or may be an indirect electrical connection through an intermediate medium.

A type of an electronic device is not specifically limited in the embodiments of this application. The electronic device may be a wireless device such as a mobile phone, a pad, a computer with a wireless transceiver function, a smart wearable product (for example, a smart watch, a smart band, or a headset), a virtual reality (VR) terminal device, or an augmented reality (AR) terminal device. The electronic device may alternatively be an electronic product such as a wireless charging electric vehicle, a wireless charging household appliance (such as a soymilk machine or a floor sweeping robot), or a drone.

To enable a person skilled in the art to better understand the technical solutions provided in the embodiments of this application, the following first describes an application scenario of wireless charging of the electronic device. An example in which the electronic device is a mobile phone is used for description.

FIG. 1 is a schematic diagram of a wireless charging system according to an embodiment of this application.

When an electronic device is a mobile phone, a wireless charging device is a wireless charger 02. The wireless charger 02 is configured to wirelessly charge the electronic device 01 (namely, the mobile phone). The wireless charger 02 shown in the figure supports the electronic device 01 horizontally placed on the wireless charger 02. In some embodiments, the wireless charger 02 may alternatively be in another form, such as a vertical wireless charger, and is slightly inclined, so that the electronic device 01 can lean against the wireless charger 02.

The wireless charging system includes a wireless charging receive (RX) terminal 20 disposed in the electronic device 01 and a battery 50 coupled to the wireless charging receive terminal 20. A direct current/direct current (DC/DC) converter may be further provided between the wireless charging receive terminal 20 and the battery 50, and the DC/DC converter may be a low dropout regulator (LDO), a buck converter, a switch capacitor converter, or the like. The buck converter may be, for example, a buck circuit.

The wireless charging system further includes a wireless charging transmit (TX) terminal 30 disposed in the wireless charger 02 and an adapter 40 coupled to the wireless charging transmit terminal 30. The adapter 40 is configured to provide charging electric energy.

The wireless charging transmit terminal 30 transmits power to the wireless charging receive terminal 20. A control signal or charging data may be transmitted between the wireless charging transmit terminal 30 and the wireless charging receive terminal 20. The control signal or the charging data may be transmitted through in-band communication or out-of-band communication. The wireless charging transmit terminal 30 and the wireless charging receive terminal 20 are wirelessly connected in an out-of-band communication manner such as Bluetooth, Wireless-Fidelity (Wi-Fi), Zigbee, radio frequency identification (RFID), a long range (Lora) wireless technology, or near field communication (NFC), so that the wireless charging transmit terminal 30 and the wireless charging receive terminal 20 can implement wireless communication.

The charging data may be used to indicate a charging type. In some embodiments, the charging data may be a charging protocol, for example, the wireless charging standard Qi proposed by the Wireless Power Consortium (WPC), a Basic Power Profile (BPP) protocol, or an Extended Power Profile (EPP) protocol.

Figure 2:
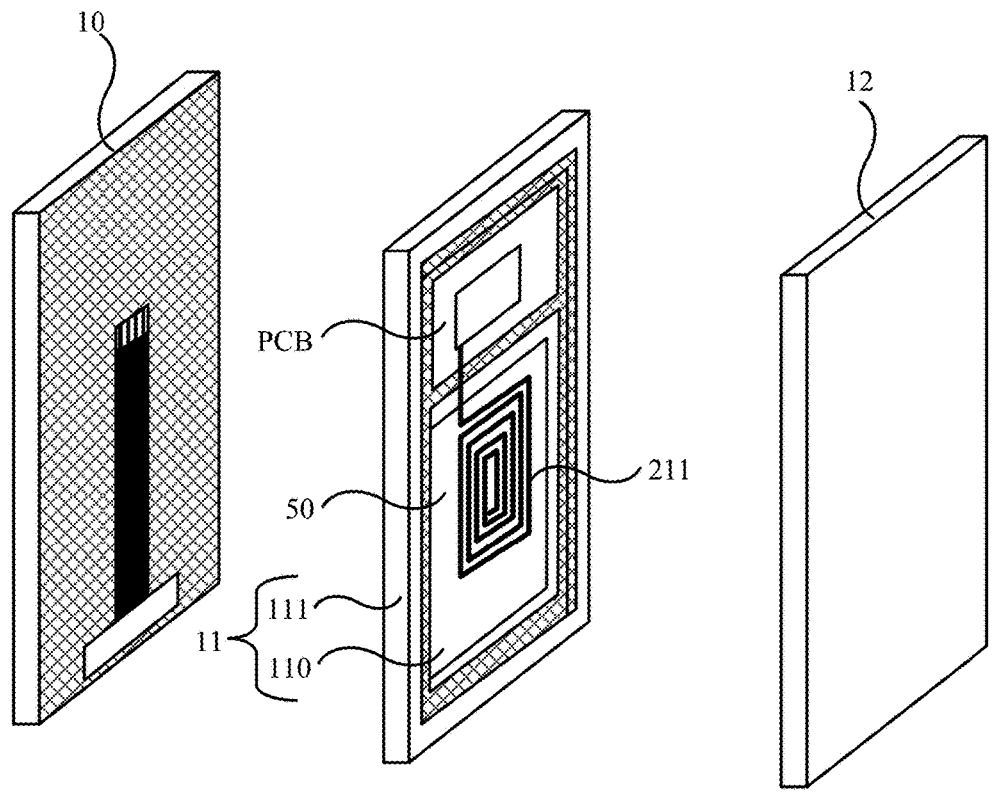
FIG. 2 is a schematic diagram of a structure of an electronic device according to an embodiment of this application.

FIG. 2 is a schematic diagram of a structure of the electronic device in FIG. 1.

An example in which the electronic device 01 is a mobile phone is used, the electronic device 01 mainly includes a display panel (DP) 10. The display panel 10 may be a liquid crystal display (LCD) panel, an organic light emitting diode (OLED) display panel, or the like. When the mobile phone uses a folding screen architecture or a multi-screen architecture, the mobile phone may alternatively include a plurality of screens. The plurality of screens may be a combination of the foregoing different types of screens. This is not limited in this embodiment of this application.

The electronic device 01 may further include a middle frame 11 and an enclosure 12. The display panel 10 and the enclosure 12 are separately located on two sides of the middle frame 11. A back facet of the display panel 10 faces the enclosure 12, and the display panel 10 is connected to the enclosure 12 through the middle frame 11. The middle frame 11 includes a bearing board 110 and a bezel 111 surrounding the bearing board 110. The electronic device 01 may further include a printed circuit board (PCB).

It should be noted that, in an actual product, a transmitter coil and a receiver coil usually may be set to disk shapes or other shapes, such as squares. This is not specifically limited herein in this embodiment of this application.

The following describes a working principle of wireless charging with reference to the accompanying drawings.

Figure 3:
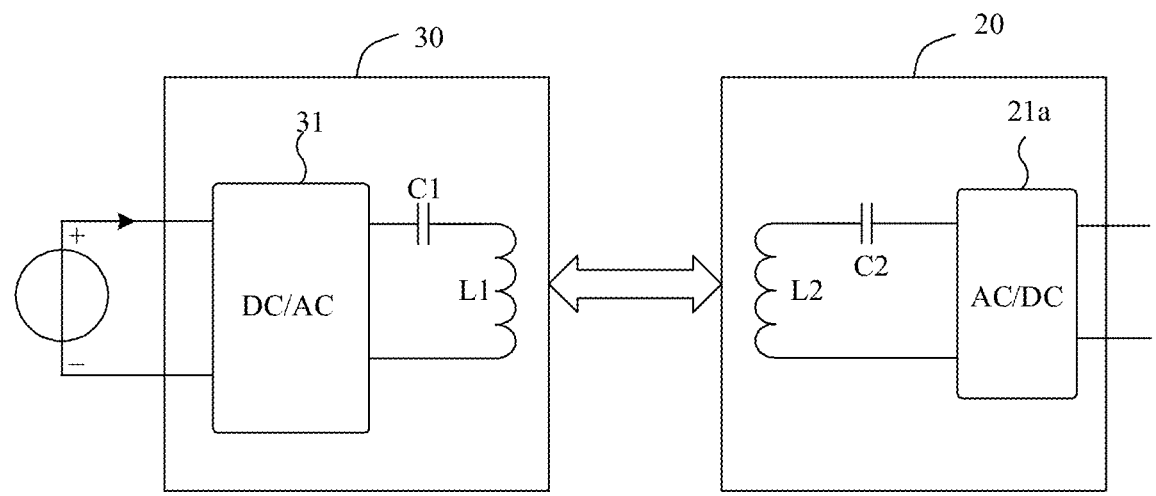
FIG. 3 is a schematic circuit diagram of a wireless charging system according to an embodiment of this application.

FIG. 3 is a schematic circuit diagram of a wireless charging system according to an embodiment of this application.

A wireless charging transmit terminal 30 is configured to emit magnetic field energy. The wireless charging transmit terminal 30 may be located in a wireless charging device.

The wireless charging transmit terminal 30 includes an inverter circuit DC/AC 31. An input terminal of the inverter circuit DC/AC 31 is configured to connect to a direct current power source, for example, connect to a direct current that is output by an adapter. An output terminal of the inverter circuit DC/AC 31 is connected to a resonant network. The resonant network includes a resonant capacitor C1 and a transmitter coil L1. An example in which the resonant capacitor C1 and the transmitter coil L1 are connected in series is used in this embodiment of this application.

A wireless charging receive terminal 20 is configured to receive the magnetic field energy emitted by the wireless charging transmit terminal 30. The wireless charging receive terminal 20 may be located in an electronic device.

The wireless charging receive terminal 20 includes a receiver coil L2, a capacitor C2, and a rectifier circuit AC/DC 21a. The rectifier circuit AC/DC 21a converts an alternating current that is output by the receiver coil L2 into a direct current to charge a battery.

It should be noted that the resonant network of the transmit terminal and the receive terminal of the wireless charging system shown in FIG. 3 is a primary-side series and secondary-side series (PSSS) resonant network. In addition, the resonant network in this embodiment of this application may alternatively be a primary-side parallel and secondary-side series (PPSS) resonant network, a primary-side parallel and secondary-side parallel (PPSP) resonant network, a primary-side series and secondary-side parallel (PSSP) resonant network, or a hybrid resonant network. This is not specifically limited in this embodiment of this application.

For ease of description, the wireless charging transmit terminal is briefly referred to as a transmit terminal and the wireless charging receive terminal is briefly referred to as a receive terminal in the following.

After converting the input electric energy into the magnetic field energy, the wireless charging device transmits the magnetic field energy through the transmit terminal. When the electronic device is around the wireless charging device, the electronic device receives, through the receive terminal, the magnetic field energy transmitted by the wireless charging device, and converts the magnetic field energy into electric energy to charge the electronic device. In this way, wireless transmission of the electric energy from the wireless charging device to the electronic device is implemented.

Figure 4:
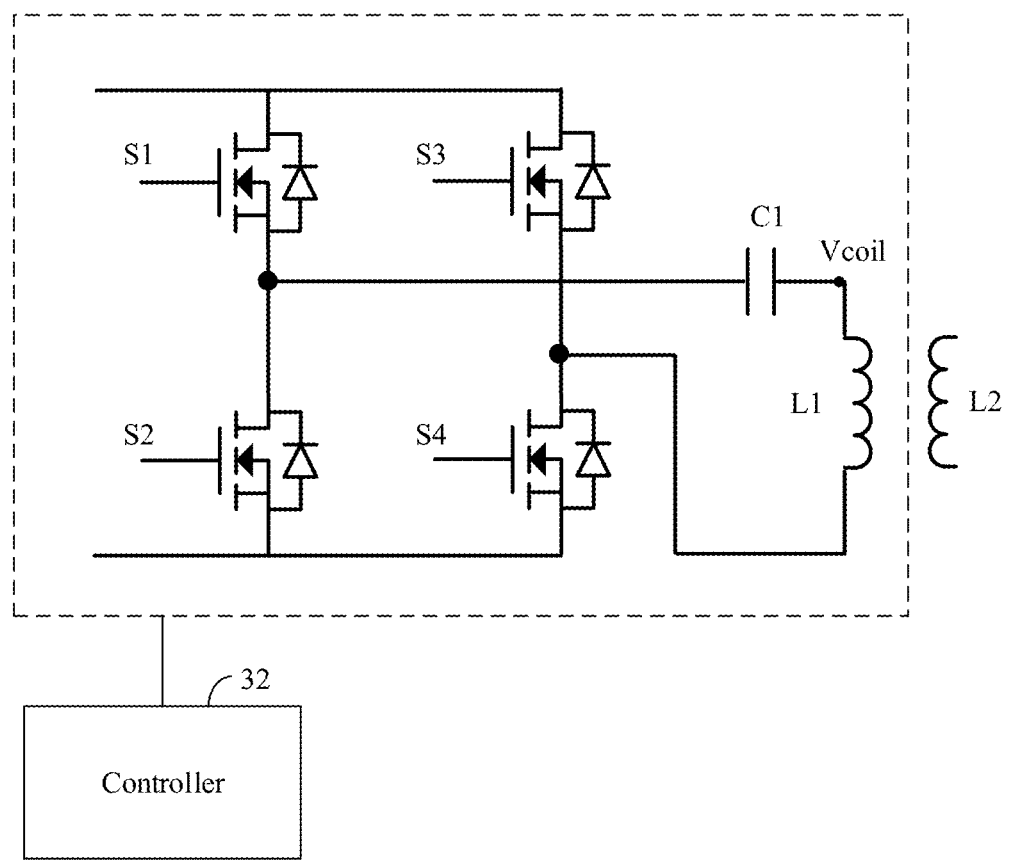
FIG. 4 is a schematic diagram of a wireless charging device according to an embodiment of this application.

FIG. 4 is a schematic diagram of a wireless charging device according to an embodiment of this application.

The wireless charging device provided in this embodiment is configured to wirelessly charge an electronic device. The wireless charging device includes: a resonant network, an inverter circuit, and a controller 32.

The resonant network includes a resonant capacitor C1 and a transmitter coil L1. In this embodiment, an example in which the resonant capacitor C1 and the transmitter coil L1 are connected in series to form a resonant network is used for description.

An input terminal of the inverter circuit is configured to connect to a direct current power source, and an output terminal of the inverter circuit is configured to connect to the resonant network.

In this embodiment, an example in which the inverter circuit is a full bridge circuit is used for description. The inverter circuit includes four controllable switch tubes, which are a first switch tube S1 to a fourth switch tube S4. As shown in FIG. 4, a first terminal of the first switch tube S1 is connected to a positive electrode of the direct current power source, a second terminal of the first switch tube S1 is connected to a first terminal of the second switch tube S2, and a second terminal of the second switch tube S2 is connected to a negative electrode of the direct current power source. That is, after being connected in series, S1 and S2 are connected between the positive electrode and the negative electrode of the direct current power source. Similarly, a first terminal of the third switch tube S3 is connected to the positive electrode of the direct current power source, a second terminal of the third switch tube S3 is connected to a first terminal of the fourth switch tube S4, and a second terminal of the fourth switch tube S4 is connected to the negative electrode of the direct current power source. That is, after being connected in series, S3 and S4 are connected between the positive electrode and the negative electrode of the direct current power source. The second terminal of S1 is connected to the second terminal of S3 through C1 and L1 that are connected in series.

L2 is a receiver coil of the electronic device. For example, if the electronic device is a mobile phone, the receiver coil L2 is located inside the mobile phone.

Currently, in the wireless charging technology, energy is transmitted through magnetic field coupling between a transmitter coil of the transmit terminal and a receiver coil of the receive terminal, and the transmitter coil and the receiver coil need to be located within a space distance. For example, when the electronic device is a mobile phone and a wearable device, a deviation between placement positions of the transmit terminal and the receive terminal in a vertical direction is generally less than 10 mm. If the deviation is greater than 10 mm, a wireless charging effect is affected. For example, charging cannot be performed or charging efficiency is low. To better perform wireless charging, in the technical solution provided in this embodiment of this application, when the position deviation between the transmitter coil and the receiver coil is large, a detection coil disposed in the transmit terminal is used to control the transmitter coil to move, so that the transmitter coil aligns with the receiver coil, resolving a technical problem that charging cannot be performed or the charging efficiency is low due to a large deviation.

The wireless charging device provided in this embodiment of this application is provided with a plurality of detection coils. The plurality of detection coils are sequentially connected to an excitation power source. When the plurality of detection coils are connected to the excitation power source, parameters of the detection coils may be detected online. A position of the receiver coil is determined by using the parameters of the detection coils, that is, a detection coil closest to the receiver coil is determined by comparing the parameters of the detection coils. Further, the transmitter coil is controlled to move to a position of the detection coil closest to the receiver coil. The detection coil that can communicate with the receiver coil is closest to the receiver coil. Therefore, the parameters of the detection coils may be used to control the transmitter coil to move to the position of the detection coil communicating with the receiver coil, so that the transmitter coil aligns with the receiver coil in the electronic device.

To enable a person skilled in the art to better understand the technical solutions provided in the embodiments of this application, the following describes specific embodiments with reference to the accompanying drawing.

Wireless Charging Device Embodiment 1

Figure 5A:
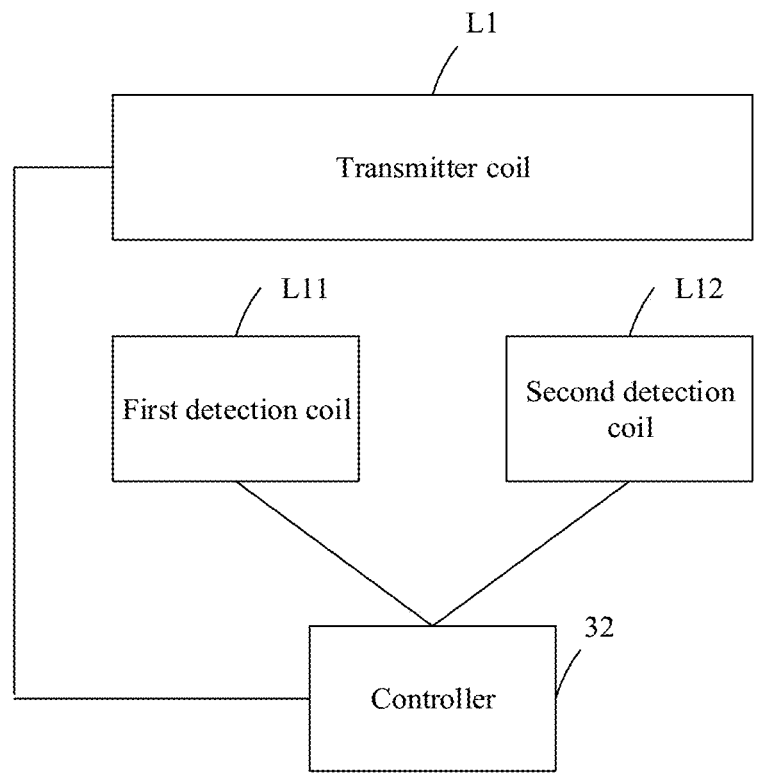
FIG. 5A is a schematic diagram of another wireless charging device according to an embodiment of this application.

FIG. 5A is a schematic diagram of a wireless charging device according to an embodiment of this application.

For ease of understanding, an example in which the wireless charging device provided in this embodiment of this application is a wireless charger, that is, a wireless charging dock, is used for description. The wireless charging device may charge an electronic device. An example in which the electronic device is a mobile phone is used for description.

The wireless charging device provided in this embodiment of this application includes: a transmitter coil L1, a controller 32, and at least two detection coils. In FIG. 5A, an example in which the detection coils include at least the following two detection coils is used for description: a first detection coil L11 and a second detection coil L12. It should be understood that the at least two detection coils may also be referred to as a detection coil array.

The first detection coil L11 and the second detection coil L12 are symmetrically arranged in an upper direction of a plane on which the transmitter coil L1 is located, and the upper direction is the side facing the electronic device. A plane on which the first detection coil L11 and the second detection coil L12 are located is parallel to the plane on which the transmitter coil L1 is located.

It should be noted that FIG. 5A shows only the case in which the first detection coil L11 and the second detection coil L12 are symmetrically arranged. The first detection coil L11 and the second detection coil L12 may alternatively be arranged in another manner. This is not specifically limited herein in this embodiment of this application. FIG. 5A shows only the case in which the first detection coil L11 and the second detection coil L12 are arranged on the side facing the electronic device. The first detection coil L11 and the second detection coil L12 may alternatively be arranged on another side. This is not specifically limited herein in this embodiment of this application.

The controller 32 is configured to: separately control the first detection coil L11 and the second detection coil L12 to sequentially connect to an excitation power source (not shown in the figure), obtain a value difference between parameters of the first detection coil L11 and the second detection coil L12 that are connected to the excitation power source, and control, based on the parameters of the first detection coil L11 and the second detection coil L12, the transmitter coil L1 to move, so that the transmitter coil L1 aligns with a receiver coil (not shown in the figure) in the electronic device.

Because a sum of areas covered by a plurality of detection coils is greater than an area covered by the transmitter coil L1, a position of the receiver coil is identified by using a detection coil array covering a larger area. Further, value differences between parameters of the detection coils are used to control the transmitter coil to move, so that the transmitter coil aligns with the receiver coil. Further, when the detection coils have a function of communicating with the receiver coil, the parameters of the detection coils are communication results. Therefore, when the transmitter coil cannot communicate with the receiver coil, another detection coil may communicate with the receiver coil. Areas that can be covered by the plurality of detection coils for communication are greater than the area that can be covered by the transmitter coil for communication. The transmitter coil may be controlled, based on whether a detection coil can implement communication, to move to a position of the detection coil communicating with the receiver coil, so that the transmitter coil aligns with the receiver coil in the electronic device.

In addition, in this embodiment of this application, the first detection coil L11 and the second detection coil L12 are disposed in an upper direction of the plane on which the transmitter coil L1 is located, and the upper direction is the side facing the electronic device. The first detection coil L11 and the second detection coil L12 are disposed on the side closer to the electronic device, so that it can be easier to detect the position of the receiver coil. In this way, a case in which detection is inaccurate because the first detection coil L11 and the second detection coil L12 are disposed on a side far away from the electronic device is avoided.

In this embodiment of this application, an example in which the first detection coil L11 and the second detection coil L12 are symmetrically arranged about a central axis of the transmitter coil L1 on the upper direction of the plane on which the transmitter coil L1 is located. A purpose of uniform and symmetrical arrangement is to enable the detection coils to cover a larger range and avoid a case in which the electronic device cannot be detected due to a small detection range.

In addition, in this embodiment of this application, a purpose of disposing the plane on which the first detection coil L11 and the second detection coil L12 are located parallel to the plane on which the transmitter coil L1 is located is to make the obtained parameters of the first detection coil L11 and the second detection coil L12 facilitate comparison. In this way, the transmitter coil L1 can align with the receiver coil more accurately based on the parameters of the detection coils. A case in which the obtained parameters cannot be compared together due to non-parallel arrangement is avoided.

In addition, a purpose of sequentially connecting rather than simultaneously connecting the detection coils in the embodiments of this application to the excitation power source is to avoid electromagnetic interference between the detection coils and avoid inaccurate obtained parameters of the detection coils caused by the electromagnetic interference.

The excitation power source is connected to the detection coils to supply power to the detection coils. When the detection coils are connected to the excitation power source, the controller 32 may obtain the parameters of the detection coils, for example, self-inductances of the detection coils or value differences between products of self-inductances and alternating current resistances of the detection coils. When a detection coil can be coupled to the receiver coil, closer coupling between the detection coil and the receiver coil indicates a shorter distance and a larger self-inductance of the corresponding detection coil. In other words, some parameters of the detection coil are in a negative monotonous relationship with the distance. In this embodiment of this application, monotonous relationships between the parameters of the detection coils and the distance are used to determine the position of the receiver coil. Because the position of the receiver coil may be indirectly obtained by using the value differences of the parameters of the detection coils, the value differences of the parameters of the detection coils are used to control the transmitter coil L1 to move to a position of a corresponding detection coil, so that the transmitter coil L1 can align with the receiver coil.

Furthermore, in addition to some electrical parameters of the detection coils, the parameters of the detection coils may further include communication results. For example, after the plurality of detection coils are sequentially connected to the excitation power source, if it is found that only one detection coil can communicate with the receiver coil, it indicates that the detection coil that can implement communication is closest to the receiver coil. In this case, the transmitter coil is moved to a position of the detection coil that can implement communication.

A quantity of detection coils is not specifically limited herein in this embodiment of this application, and may be set by a person skilled in the art based on an actual condition, for example, may be set to two, three, four, or more detection coils. To make a range covered by the detection coils bigger and more uniform, the quantity of detection coils may be set based on a size of the transmitter coil and a movable range that can be covered, so that the detection coils cover the range corresponding to the transmitter coil as evenly as possible.

In addition, a shape and a size of each detection coil are not limited in this embodiment of this application either. For ease of detection and simplification of a process, it may be set that sizes and shapes of all detection coils are consistent. Shapes of the detection coils are not specifically limited in this embodiment of this application either, for example, may be circles or regular polygons such as regular quadrangles, regular pentagons, or regular hexagons.

In addition, a specific quantity of turns of the detection coils is not limited in this embodiment of this application either, for example, may be one turn of coil, or may be a plurality of turns of coils. In other words, the detection coils include at least one turn of coil of a preset shape, and the preset shape may be the circle or the regular polygon described above. For example, to save a material and facilitate a layout, the detection coil may be provided with only one turn of coil. The detection coils may be winding coils, or may be coils in forms of printed circuit boards (PCB).

In a space layout, a position relationship between the plurality of detection coils is not limited in this embodiment of this application either. For example, two neighboring detection coils may be in contact, in other words, a contact portion has no gap. For example, when the plurality of detection coils are circles of same sizes, two neighboring circles may be tangent, that is, are in contact. When the plurality of detection coils are squares of same sizes, two neighboring squares share one side, that is, are in contact.

In addition, any two neighboring detection coils may alternatively be spaced by a preset distance. A specific value of the preset distance is not limited in this embodiment of this application, and may be set based on a size of the transmitter coil and sizes of the detection coils. When two neighboring detection coils are in contact, a charging range that can be covered by the transmitter coil may be small, but a detection dead zone between the detection coils is also smaller, and movement control over the transmitter coil is easier.

When two neighboring detection coils are spaced by the preset distance, that is, a gap exists between the two neighboring detection coils, the charging range that can be covered by the transmitter coil can be expanded, but the detection dead zone between the detection coils may also be larger, and movement control over the transmitter coil is more complex.

The transmitter coil in the wireless charging device provided in this embodiment of this application can move. Whether the detection coils can move is not limited in this embodiment of this application, in other words, the detection coils may move with the transmitter coil, or the detection coils may not move.

Figure 5B:
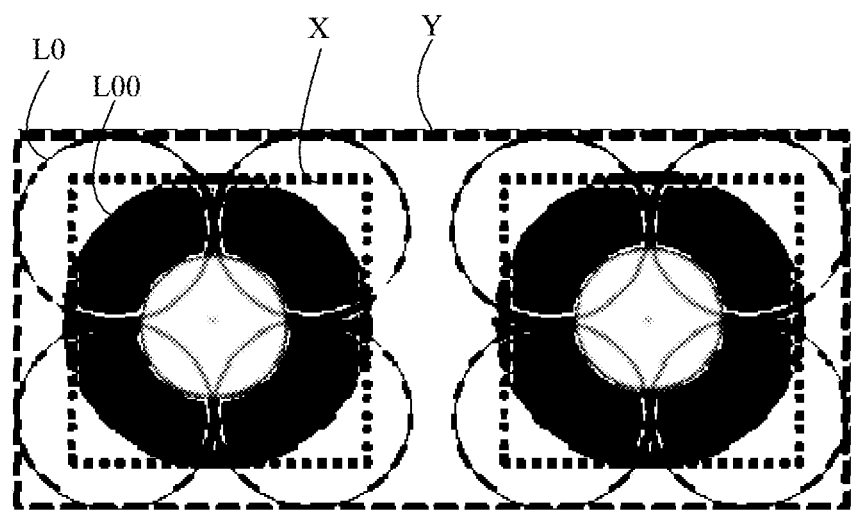
FIG. 5B is a schematic diagram of still another wireless charging device according to an embodiment of this application.

With reference to FIG. 5B, the following describes the implementation in which the detection coils are fastened to the transmitter coil and move with the transmitter coil.

FIG. 5B is a schematic diagram of an implementation of detection coils according to an embodiment of this application.

In FIG. 5B, an example in which the wireless charging device is a one-to-many wireless charger is used for description, that is, includes a plurality of transmitter coils. An example in which there are two transmitter coils is used for description below.

Each transmitter coil corresponds to four detection coils, that is, two transmitter coils L00 correspond to a total of eight detection coils L0. In the figure, small broken line boxes X are regions that may align with the transmitter coils, and a big broken line box Y is a region in which the two transmitter coils in the wireless charging device may perform overall charging.

In this embodiment, four detection coils corresponding to each transmitter coil may move with the transmitter coil. In this case, installation manners of the detection coils and impact on movable space of the transmitter coils need to be considered.

Figure 5C:
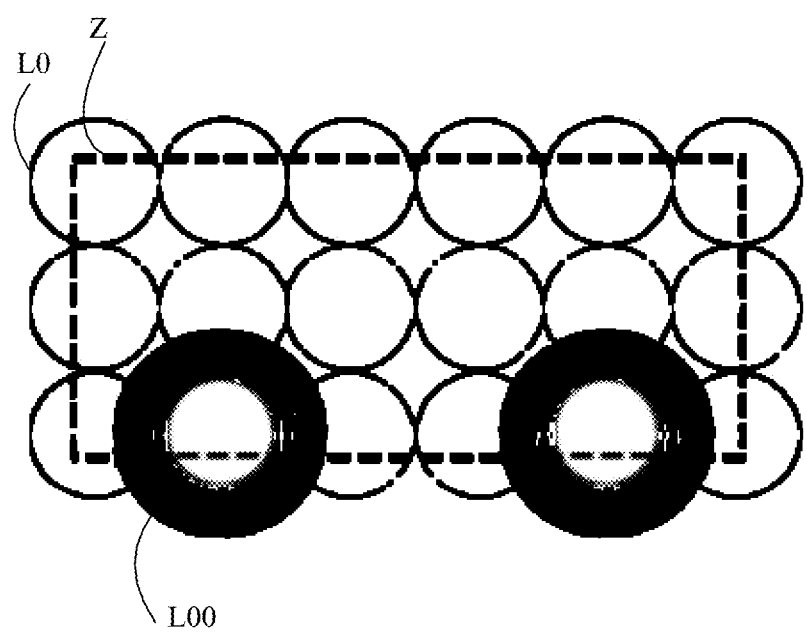
FIG. 5C is a schematic diagram of still another wireless charging device according to an embodiment of this application.

With reference to FIG. 5C, the following describes the implementation in which the detection coils are stationary and do not move with the transmitter coils.

FIG. 5C is a schematic diagram of a structure in which detection coils are separated from transmitter coils according to an embodiment of this application.

An example in which one wireless charging device charges a plurality of devices and there are two transmitter coils is used.

Because the detection coils are stationary and do not move with the transmitter coils, each transmitter coil may correspond to more detection coils. In the figure, an example in which one transmitter coil corresponds to nine detection coils is used for description.

The figure shows a total of 18 detection coils L0 and 2 transmitter coils L00. A big broken line box region Z is a region, formed by the two transmitter coils, that may perform overall charging.

The detection coils L0 may be fastened, in other words, when the transmitter coils L00 move, all the detection coils L0 are stationary. For example, the detection coils L0 may be fastened to a housing of a transmit terminal and do not move with the transmitter coils L00. In this case, the transmitter coils and the detection coils are separately disposed. For this case, because the detection coils are fastened, movement space of the detection coils does not need to be considered, thereby facilitating expansion of a detection region and implementing a charging plane with a larger range. This is particularly applicable to a scenario in which one wireless charging device wirelessly charges a plurality of devices.

This embodiment of this application provides a wireless charging device and a plurality of detection coils are disposed. When position deviations between the transmitter coils in the wireless charging device and a receiver coil in the electronic device are large, a controller controls, by using parameters of the plurality of detection coils, the transmitter coils to move. Because the detection coils are disposed on a side closer to the electronic device, it is easier for the detection coils to detect the position of the receiver coil. The controller controls all the detection coils to sequentially connect to the excitation power source, and sequentially obtains the parameters of the detection coils connected to the excitation power source, thereby avoiding electromagnetic interference of the detection coils caused by simultaneous connections of all the detection coils to the excitation power source, and avoiding that the obtained parameters of the detection coils are inaccurate due to the electromagnetic interference. In addition, a plane on which the detection coils are located is parallel to a plane on which the transmitter coils are located, and the parameters of all the detection coils are obtained in a same condition, thereby facilitating comparison between the parameters of all the detection coils. The controller controls, based on the parameters of the detection coils, the transmitter coils to move, so that the transmitter coils align with the receiver coil in the electronic device. The wireless charging device provided in this embodiment of this application can implement automatic alignment. Therefore, when the electronic device is wirelessly charged, even if a position at which the electronic device is placed does not align with the transmitter coils exactly, the controller can still control the transmitter coils to move, so as to implement automatic alignment of the transmitter coils and the receiver coil, thereby improving charging flexibility and wireless charging experience of a user.

For ease of description and understanding of a person skilled in the art, an example in which the wireless charging device includes four detection coils is used for description below, and the description is provided by using an example in which each detection coil is a circle with an equal size.

Wireless Charging Device Embodiment 2

With reference to the accompanying drawings, the following describes an implementation in which a plurality of detection coils are connected to an excitation power source.

Figure 6A:
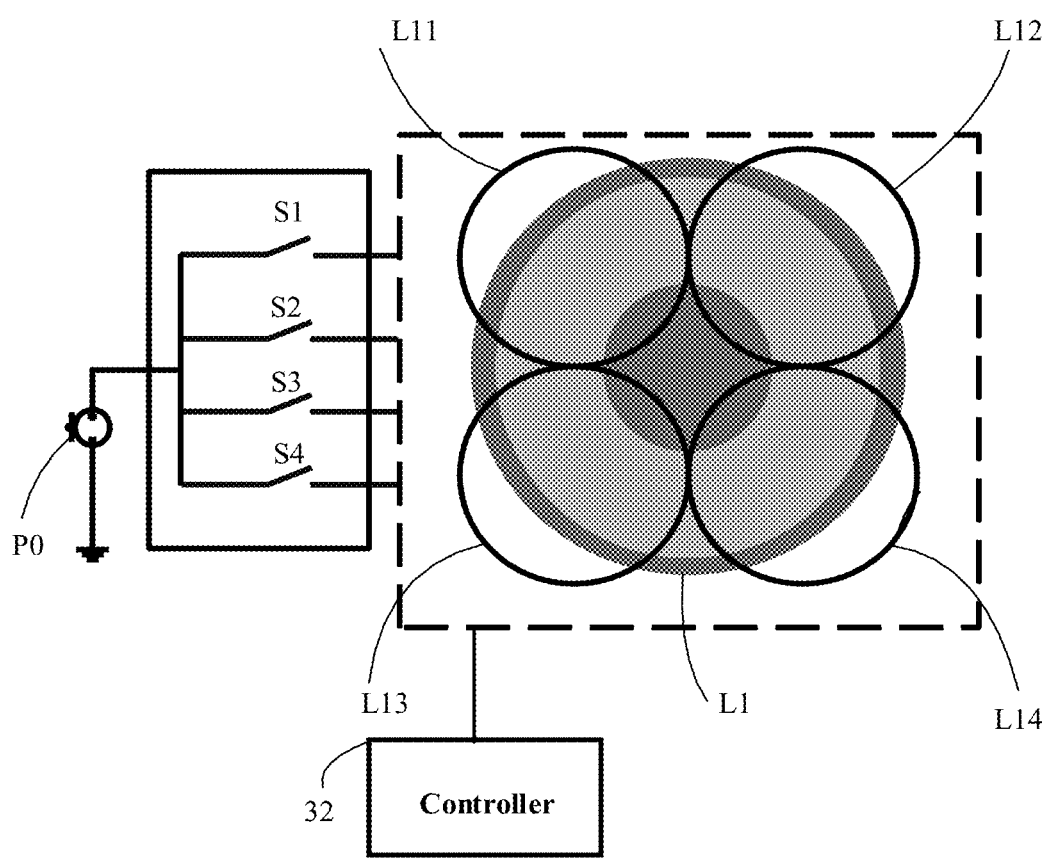
FIG. 6A is a schematic diagram of yet another wireless charging device according to an embodiment of this application.

FIG. 6A is a schematic diagram of another wireless charging device according to an embodiment of this application.

On the basis of the wireless charging device embodiment 1, before wireless charging is performed, a foreign matter, such as a metal foreign matter, may exist between the wireless charging device and an electronic device. A changing magnetic field generated between a transmitter coil L1 and a receiver coil generates an eddy current loss and heat on the metal foreign matter. Therefore, before wireless charging is performed, a Q value of each detection coil may further be obtained. When the Q value of the detection coil is less than or equal to a preset Q threshold, it is determined that a metal foreign matter exists between the transmitter coil L1 and the receiver coil. To prevent the metal foreign matter from affecting wireless charging, the metal foreign matter may be removed first before wireless charging is performed.

The plurality of detection coils may be sequentially connected to the excitation power source P0 through a plurality of switching circuits. The plurality of switching circuits include at least a switch module. A specific implementation of the switch module is not limited in this embodiment of this application, for example, may be a controllable switch. A quantity of switch modules may be equal to a quantity of detection coils, in other words, the switch modules are in a one-to-one correspondence with the detection coils.

As shown in FIG. 6A, the plurality of switching circuits are connected between the excitation power source P0 and the detection coils. In this embodiment, an example in which there are four detection coils is used for description: a first detection coil L11, a second detection coil L12, a third detection coil L13, and a fourth detection coil L14.

Because switches are in a one-to-one correspondence with the detection coils, an example in which the plurality of switching circuits include four switches is used for description below. The four switches are: a first switch S1, a second switch S2, a third switch S3, and a fourth switch S4.

A controller 32 may be configured to control switching actions in the plurality of switching circuits, so that the detection coils are sequentially connected to the excitation power source P0. In addition, only one switch is closed, and all other switches are open. In other words, it is ensured that only one detection coil is connected to the excitation power source P0 at one time, thereby avoiding electromagnetic interference generated due to simultaneous connections of the plurality of detection coils to the excitation power source.

For example, when the first switch S1 is closed, the second switch S2, the third switch S3, and the fourth switch S4 are all open, and the controller 32 controls a detection coil A to connect to the excitation power source P0.

When the second switch S2 is closed, the first switch S1, the third switch S3, and the fourth switch S4 are all open, and the controller 32 controls a detection coil B to connect to the excitation power source P0.

When the third switch S3 is closed, the first switch S1, the second switch S2, and the fourth switch S4 are all open, and the controller 32 controls a detection coil C to connect to the excitation power source P0.

When the fourth switch S4 is closed, the first switch S1, the second switch S2, and the third switch S3 are all open, and the controller 32 controls a detection coil D to connect to the excitation power source P0.

For example, parameters of the detection coils obtained by the controller 32 may be self-inductances of the detection coils. The controller 32 may control the transmitter coil L1 to move toward a detection coil with a largest self-inductance. Because a self-inductance may be generated when a detection coil is coupled to the receiver coil (not shown in the figure), closer coupling between the detection coil and the receiver coil indicates a shorter distance between the detection coil and the receiver coil and a larger self-inductance corresponding to the detection coil. In other words, the self-inductance of the detection coil is in a negative monotonous relationship with the distance. The transmitter coil L1 is moved toward the corresponding detection coil with the largest self-inductance, so that the transmitter coil L1 aligns with the receiver coil.

An example in which the parameters obtained by the controller 32 are the self-inductances of the detection coils is used for detailed description below.

If the first detection coil L11 is connected to the excitation power source P0, the parameter obtained by the controller 32 may be a self-inductance L11 of the first detection coil L11.

If the second detection coil L12 is connected to the excitation power source P0, the parameter obtained by the controller 32 may be a self-inductance L12 of the second detection coil L12.

If the third detection coil L13 is connected to the excitation power source P0, the parameter obtained by the controller 32 may be a self-inductance L13 of the third detection coil L13.

If the fourth detection coil L14 is connected to the excitation power source P0, the parameter obtained by the controller 32 may be a self-inductance L14 of the fourth detection coil L14.

The self-inductances of the first detection coil L11, the second detection coil L12, the third detection coil L13, and the fourth detection coil L14 may be compared to determine the detection coil with the largest self-inductance, so as to control the transmitter coil L1 to move toward the corresponding detection coil with the largest self-inductance. For example, when the self-inductance of the first detection coil L11 is the largest, the controller 32 controls the transmitter coil L1 to move toward the first detection coil L11, so as to implement automatic alignment of the transmitter coil L1 and the receiver coil.

Similarly, the parameters of the detection coils obtained by the controller 32 may be self-inductances and alternating current resistances of the detection coils. In this case, the controller 32 moves the transmitter coil L1 toward a detection coil with a largest product of a self-inductance and an alternating current resistance.

For example, when a product of the self-inductance L11 of the detection coil L11 and an alternating current resistance ACR 11 of the detection coil L11 is the largest, the controller 32 controls the transmitter coil L1 to move toward the detection coil L11, so as to implement automatic alignment of the transmitter coil L1 and the receiver coil L2.

In the wireless charging device provided in this embodiment of this application, a standard for the controller 32 to control the transmitter coil L1 to move is the self-inductances of the detection coils or the products of the self-inductances and the alternating current resistances, and the transmitter coil L1 is moved toward the region corresponding to the detection coil with the largest self-inductance or toward a direction with the largest product of the self-inductance and the alternating current resistance. Because when a detection coil is close to the receiver coil, the detection coil generates an electromagnetic field under an action of the excitation power source P0, and the receiver coil also induces the electromagnetic field. When a distance between the detection coil and the receiver coil is less than a preset distance threshold, the detection coil is electromagnetically coupled to the receiver coil. A shorter distance between a detection coil and the receiver coil indicates closer coupling between the detection coil and the receiver coil and a larger self-inductance of the corresponding detection coil. In other words, the self-inductance of the detection coil is in a negative monotonous relationship with the distance. In this case, the detection coil with the largest self-inductance is closest to the receiver coil, and the transmitter coil L1 is moved toward the detection coil with the largest self-inductance, so that the transmitter coil L1 aligns with the receiver coil. It should be understood that when the transmitter coil L1 is close to the receiver coil, wireless communication may be performed, and further, wireless charging may be performed.

A region covered by the plurality of detection coils provided in this embodiment of this application is greater than a region covered by the transmitter coil. Therefore, a coupling status between the detection coil and the receiver coil may be used to control the transmitter coil to move. In other words, alignment of the transmitter coil and the receiver coil is indirectly implemented by using the detection coils.

Figure 6B:
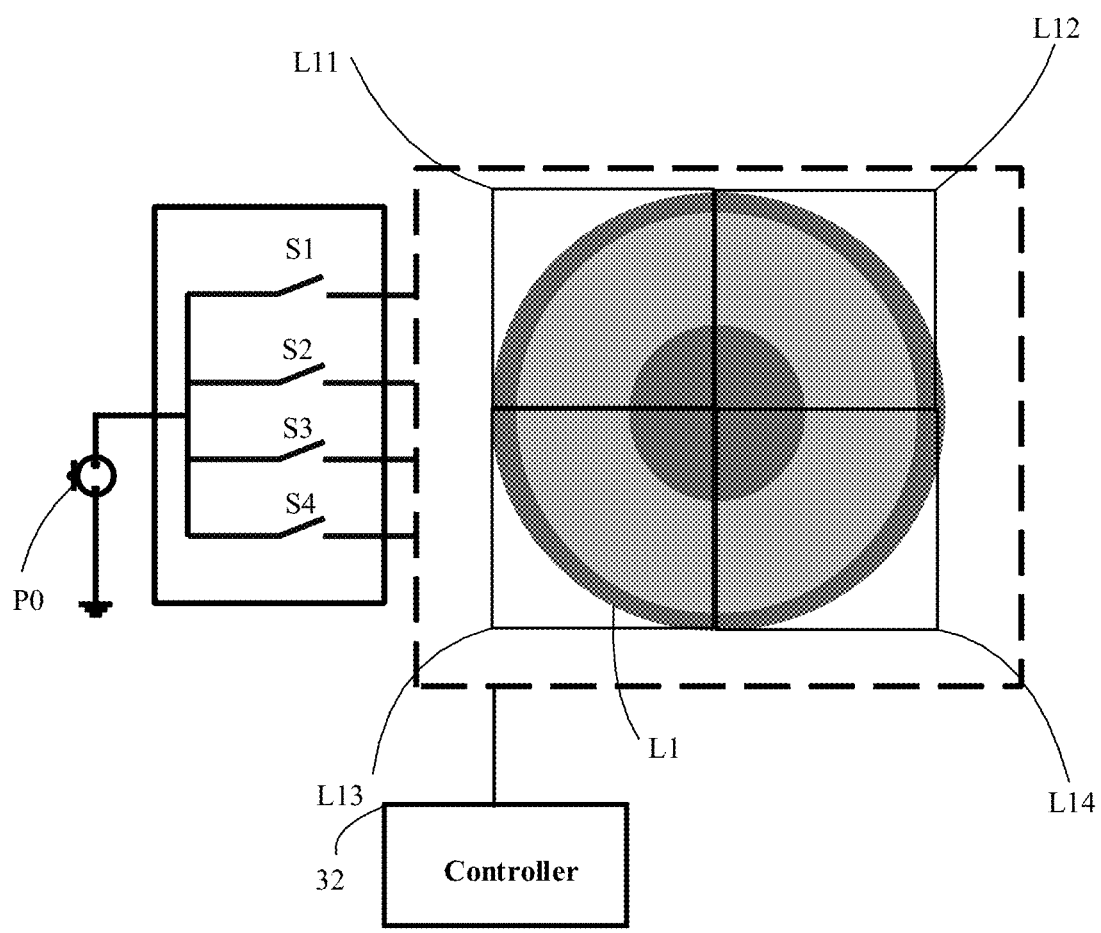
FIG. 6B is a schematic diagram of another wireless charging device according to an embodiment of this application.

In addition, FIG. 6B is a schematic diagram of another wireless charging device according to an embodiment of this application. Detection coils are squares of equal sizes. Detection and automatic alignment processes are consistent with those when the detection coils are circles of equal sizes. Details are not described herein again. In the wireless charging device provided in the foregoing embodiment, the self-inductances of the detection coils or the products of the self-inductances and the alternating current resistances of the detection coils are used to determine a position of the receiver coil, so as to implement automatic alignment of the transmitter coil L1 and the receiver coil. In addition, the parameters obtained by the controller 32 may alternatively be communication results between all the detection coils and the receiver coil. The transmitter coil L1 is controlled, based on the communication results, to move toward a detection coil corresponding to a communication result being a success. Details are described below with reference to the accompanying drawings.

Wireless Charging Device Embodiment 3

In this embodiment of this application, parameters obtained by a controller 32 may be communication results between all detection coils and a receiver coil. A transmitter coil L1 is controlled to move toward a detection coil corresponding to a communication result being a success.

In the wireless charging Qi standard, a communication success means that a ping is successfully started. The ping can be successfully started in a "ping region". The transmitter coil L1 of a transmit terminal starts the ping, the receiver coil of a receive terminal induces an electromagnetic field, and a voltage generated by rectification is high enough, so that a circuit of the receive terminal starts to work, a region in which the transmitter coil is currently located is referred to as the "ping region". Once the ping is successfully started, the receive terminal sends a communication packet and transfers information representing coupling strength of the transmitter coil and the receiver coil to the transmit terminal, and the information is referred to as a signal strength packet in the Qi standard. The signal strength packet represents intensity of the coupling strength, and is actually indicated by a magnitude of an output voltage of a rectifier circuit in an electronic device. A higher output voltage indicates a larger coupling strength. A larger coupling strength indicates a short radial distance between a center of a transmitter coil and a center of a receiver coil on a plane parallel to a surface of the transmit terminal, in other words, the transmitter coil L1 and the receiver coil are aligned.

Similarly, a communication result, being a "ping success", between a detection coil and the receiver coil is viewed as a communication success. The transmitter coil L1 is moved toward a region corresponding to the detection coil corresponding to the communication success, to implement automatic alignment of the transmitter coil L1 and the receiver coil.

Figure 7:
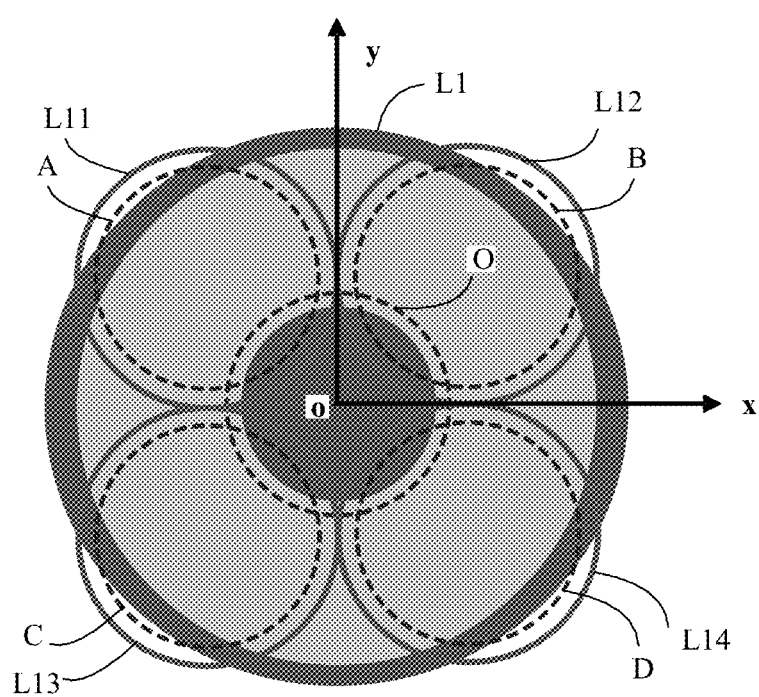
FIG. 7 is a schematic diagram of movement of a transmitter coil according to an embodiment of this application.

The communication success may include the following several cases:

FIG. 7 is a schematic diagram of movement of a transmitter coil according to an embodiment of this application.

Broken line circle regions in the figure show regions in which a center of a receiver coil is located when communication succeeds without moving a transmitter coil L1 or by moving a transmitter coil L1 once.

A range of a broken line circle corresponding to a center of the transmitter coil in the figure shows a communicable region of an initial position of the transmitter coil L1. When the center of the receiver coil is located in the range of the broken line circle corresponding to the center of the transmitter coil and the transmitter coil L1 may be directly coupled to the receiver coil, it indicates that the transmitter coil L1 aligns with the position of the receiver coil and the transmitter coil L1 does not need to be moved for alignment. In this case, the transmitter coil can directly communicate with the receiver coil, that is, the communication succeeds.

When the center of the receiver coil is located in four peripheral broken line circles, the transmit terminal can communicate with the receive terminal by moving the transmitter coil L1 once. For example, self-inductances of four detection coils may be detected. When the center of the receiver coil is located in a broken line circle A, a self-inductance of a first detection coil L11 is the largest, that is, coupling strength between the first detection coil L11 and the receiver coil is the highest, and the first detection coil L11 can successfully communicate with the receiver coil. In this case, the transmitter coil L1 may be controlled to move to a region corresponding to the first detection coil L11, to be specific, the center of the transmitter coil L1 (that is, a region corresponding to the broken line circle O) is moved to a region corresponding to the broken line circle A, so that the transmitter coil L1 can communicate with the receiver coil. The foregoing described case is applicable to alignment of the transmitter coil L1 and the receiver coil that can be implemented by moving the transmitter coil L1 only once.

Figure 8:
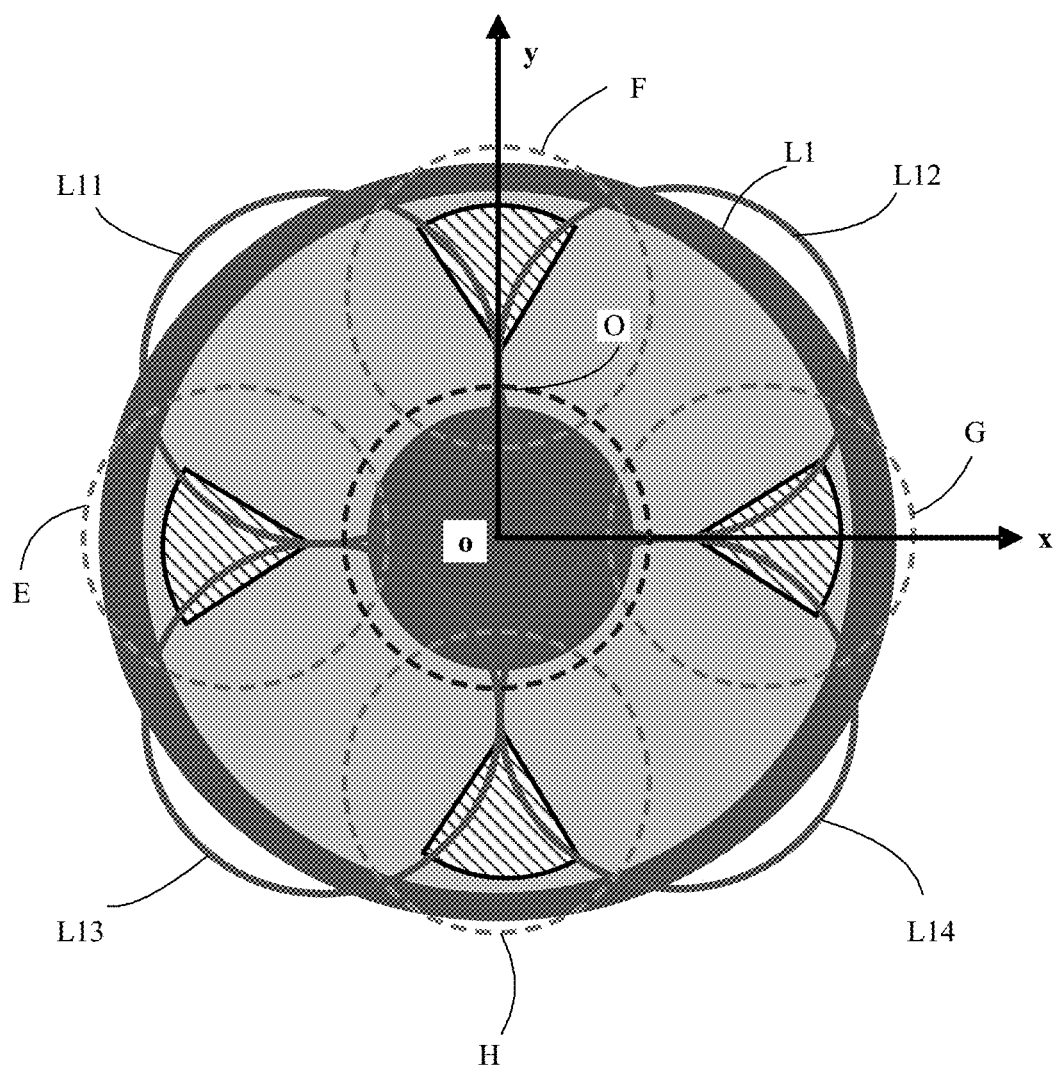
FIG. 8 is a schematic diagram of movement of another transmitter coil according to an embodiment of this application.

FIG. 8 is a schematic diagram of movement of another transmitter coil according to an embodiment of this application.

Broken line circle regions in the figure show regions in which a center of a receiver coil is located when communication can succeed only by moving a transmitter coil L1 a plurality of times.

When the center of the receiver coil is located in four peripheral broken line circles shown in the figure, that is, when the center of the receiver coil is located in communication dead zones between detection coils, the transmit terminal can communicate with the receive terminal by moving the transmitter coil L1 a plurality of times. Self-inductances of the four detection coils may be obtained first, a detection coil with a largest self-inductance among the four detection coils is determined, and the transmitter coil is moved to a region corresponding to the detection coil with the largest self-inductance, so that first movement is completed. Further, a detection coil with a second largest self-inductance among the four detection coils is determined to move the transmitter coil toward the detection coil with the second largest self-inductance. In a moving process, each time the transmitter coil L1 is moved by a distance, the transmitter coil L1 attempts to communicate with the receiver coil, until the communication succeeds.

For example, when the center of the receiver coil is located in a broken line circle E, self-inductances of the four detection coils may be sequentially obtained first, and the detection coil corresponding to the largest self-inductance among the four detection coils is determined. For example, if it is detected that a self-inductance L11 corresponding to a first detection coil L11 is the largest, the transmitter coil L1 is moved to a region corresponding to the first detection coil L11, that is, a center of the transmitter coil L1 (that is, a region corresponding to a broken line circle O) is moved to the region corresponding to the first detection coil L11. However, because the center of the receiver coil is currently located in a communication dead zone, namely, the broken line circle E, coupling strength between the transmitter coil L1 and the receiver coil is still low, and communication cannot succeed. To enable successful communication between the transmitter coil L1 and the receiver coil, the detection coil corresponding to the second largest self-inductance needs to be obtained. For example, if it is detected that a self-inductance corresponding to a third detection coil L13 is currently the second largest, the transmitter coil L1 continues to be controlled to move toward the third detection coil L13. In a moving process, each time the transmitter coil L1 is moved by a distance, the transmitter coil L1 attempts to communicate with the receiver coil, until the coupling strength between the transmitter coil L1 and the receiver coil reaches a standard for successful communication.

Both FIG. 7 and FIG. 8 are described by using a case in which two neighboring coils in the four detection coils are in contact. The following describes a case in which a gap exists between detection coils with reference to FIG. 9.

Figure 9:
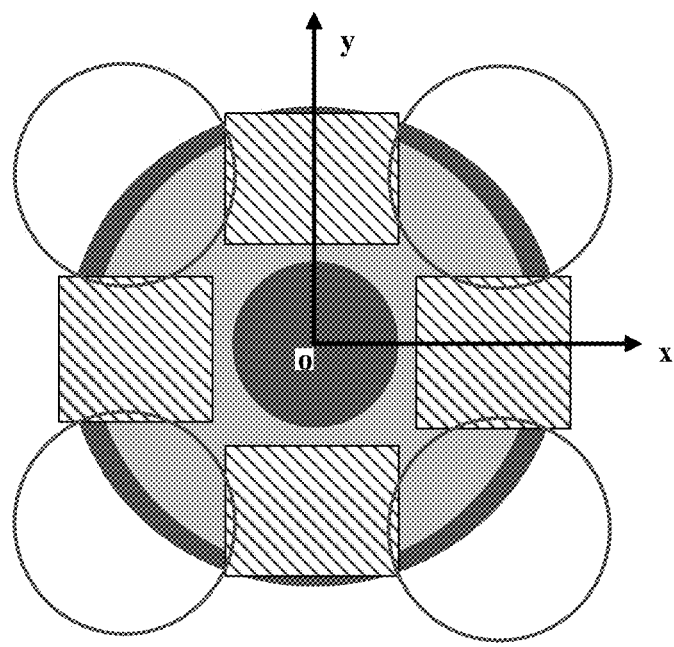
FIG. 9 is a schematic diagram of a layout of detection coils according to an embodiment of this application.

FIG. 9 is a schematic diagram of a layout of detection coils according to an embodiment of this application.

A gap exists between the detection coils in the figure.

FIG. 9 shows a wireless charging device in which the detection coils are spaced by a distance. A charging range that can be covered by moving a transmitter coil L1 may be increased by properly increasing the distance between the detection coils. However, communication dead zones (shaded portions in the figure) between the detection coils may become larger. When a center of a receiver coil is located in the communication dead zones, communication can be succeed by moving the transmitter coil more times.

It should be noted that a specific moving distance each time may be determined by a person skilled in the art based on an actual setting of the wireless charging device and is not specifically limited herein in this application.

The embodiments of this application provide a wireless charging device, and a communication function between a transmitter coil L1 and a receiver coil may be used. The transmitter coil L1 is moved, so that the transmitter coil can communicate with the receiver coil, thereby implementing automatic alignment of the transmitter coil L1 and the receiver coil.

The foregoing embodiments show merely the case in which the transmitter coil L1 is roughly adjusted to implement automatic alignment of the transmitter coil L1 and the receiver coil. In addition, the transmitter coil L1 may be finely adjusted to further implement more accurate alignment of the transmitter coil L1 and the receiver coil.

Wireless Charging Device Embodiment 4

In a possible embodiment of this application, a controller 32 is further configured to: obtain at least one of the following parameters of a wireless charging device: working frequency, a self-inductance of a transmitter coil, an alternating current resistance of a transmitter coil, a current of a transmitter coil, or an input voltage of a transmitter coil; and control, based on the at least one parameter, the transmitter coil to move, so that the transmitter coil further aligns with a receiver coil in an electronic device.

Wireless Charging Device Embodiment 5

In a possible embodiment of this application, the controller 32 may further be configured to: obtain a charging parameter, and control, based on the charging parameter, a transmitter coil to move, so that the transmitter coil further aligns with a receiver coil in an electronic device; and the charging parameter may include: charging efficiency, a charging voltage, a mutual inductance between the transmitter coil and the receiver coil, or a coupling parameter between the transmitter coil and the receiver coil.

Wireless Charging Device Embodiment 6

Figure 10:
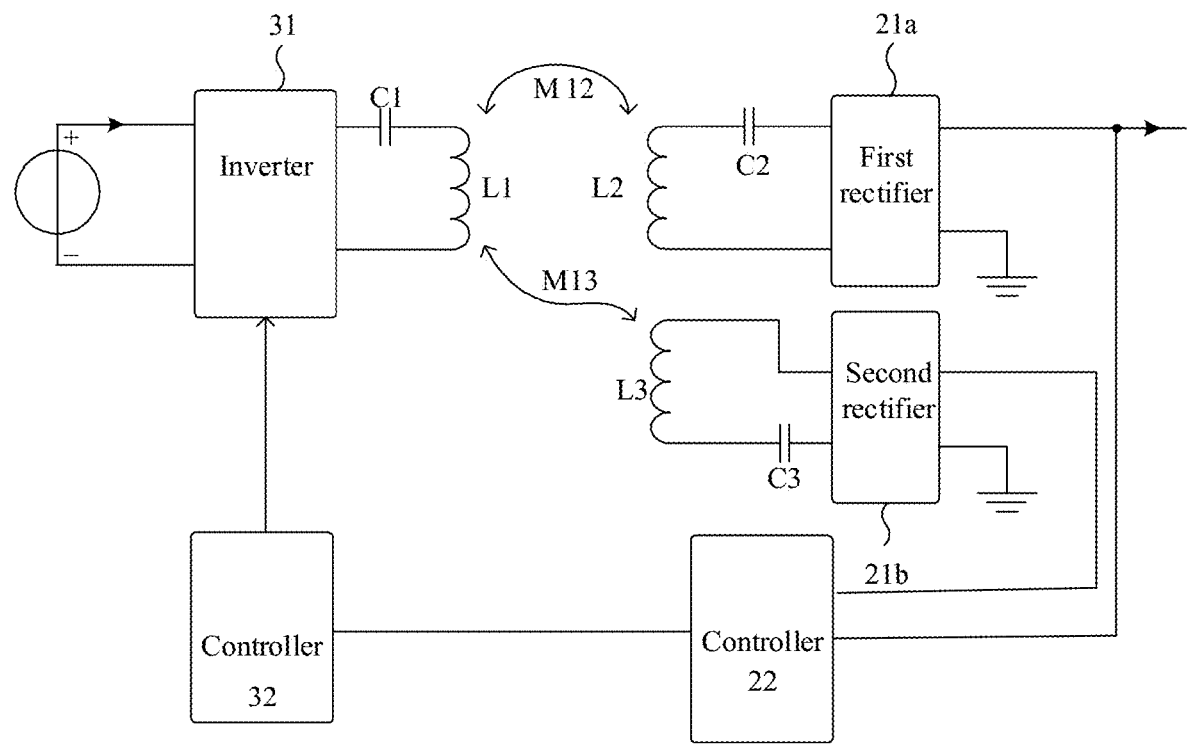
FIG. 10 is a schematic diagram of a wireless charging system according to an embodiment of this application.

FIG. 10 is a schematic diagram of a wireless charging system according to this application.

In a possible embodiment of this application, an electronic device may further include an auxiliary coil, and a charging parameter further includes a mutual inductance between a transmitter coil and the auxiliary coil or a coupling parameter between a transmitter coil and the auxiliary coil.

The electronic device includes: a receiver coil L2, an auxiliary coil L3, a first rectifier 21a, and a second rectifier 21b. A first terminal of L2 is connected to a positive input terminal of the first rectifier 21a through C2. A second terminal of L2 is connected to a negative input terminal of the first rectifier 21a. An output terminal of the first rectifier 21a is configured to connect to a rear-stage charging circuit. The rear-stage charging circuit is configured to charge a battery in the electronic device. In essence, L2 and C2 are connected in series to the input terminal of the first rectifier 21a.

The auxiliary coil L3 and a capacitor C3 are connected in series to an input terminal of the second rectifier 21b.

The controller controls a full bridge inverter circuit of a transmit terminal to be in an inverter working state, controls a receive terminal to be in a no load state, obtains a direct current output voltage of the auxiliary coil and a current of the transmitter coil, and obtains a coupling parameter in at least one parameter based on the current of the transmitter coil, the direct current output voltage of the auxiliary coil, working frequency, a self-inductance of the transmitter coil, and a self-inductance of the auxiliary coil. The coupling parameter between the transmitter coil and the auxiliary coil may be obtained by using the following calculation formula (4):

$$k = \frac{V_{ac3}}{\omega\sqrt{L1 \cdot L3}\, I_1} \cdot \beta \qquad (4)$$

where $V_{ac3}$ is the direct current output voltage of the auxiliary coil, $I_1$ is the current of the transmitter coil, $\omega$ is known working frequency, L1 is the self-inductance of the transmitter coil, and L3 is the self-inductance of the auxiliary coil.

After obtaining the coupling parameter between the transmitter coil and the auxiliary coil, the controller 200 obtains a coil mutual inductance in the at least one parameter based on the current of the transmitter coil, the direct current output voltage of the auxiliary coil, and the working frequency that correspond to the receive terminal in the no load state. The coil mutual inductance $M_2$ between the transmitter coil and the auxiliary coil may be obtained by using the following calculation formula (5):

$$M_2 = \frac{V_{ac3}}{\omega I1} \cdot \beta \qquad (5)$$

where $V_{ac3}$ is the direct current output voltage of the auxiliary coil, I1 is the current of the transmitter coil, and $\omega$ is known working frequency.

In the foregoing calculation formula for the coupling parameter between the transmitter coil and the auxiliary coil, $\beta$ may be measured through experiments. A person skilled in the art may further modify a value of $\beta$ to further improve accuracy of detecting the coupling parameter.

Figure 11:
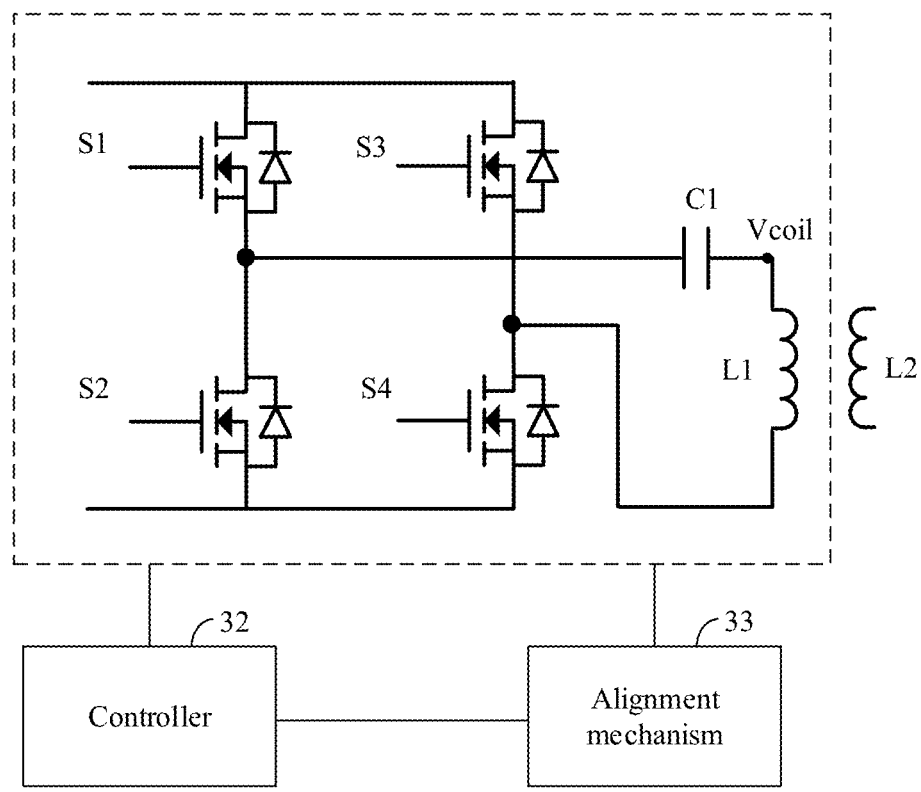
FIG. 11 is a schematic diagram of another wireless charging device according to an embodiment of this application.

FIG. 11 is a schematic diagram of another wireless charging device according to an embodiment of this application.

The wireless charging device provided in this embodiment further includes an alignment mechanism 33 to implement final alignment of a transmitter coil L1 and a receiver coil. A controller controls the alignment mechanism to drive the transmitter coil L1, so that the transmitter coil L1 aligns with the receiver coil; and controls the transmitter coil L1 to return an original position after the wireless charging device finishes charging an electronic device.

The controller 32 controls, based on a movement direction of the transmitter coil, the alignment mechanism 33 to drive the transmitter coil to move along the movement direction of the transmitter coil.

An implementation of the alignment mechanism is that the alignment mechanism includes at least: a first motor, a second motor, a first rail, and a second rail.

The first rail is perpendicular to the second rail.

The first motor is configured to drive the transmitter coil to move along the first rail.

The second motor is configured to drive the transmitter coil to move along the second rail.

The controller is configured to control the first motor and the second motor, so that the transmitter coil moves along the movement direction.

Figure 12:
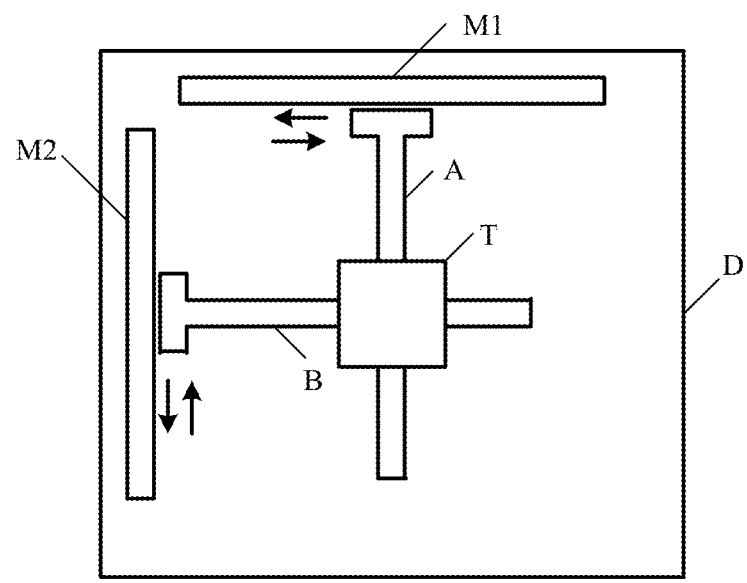
FIG. 12 is a schematic diagram of an alignment mechanism according to an embodiment of this application.

FIG. 12 is a schematic diagram of an alignment mechanism according to an embodiment of this application.

In FIG. 12, x and y respectively represent two perpendicular directions on a horizontal plane. For example, if x represents a horizontal direction, y represents a direction perpendicular to the horizontal direction. Units are millimeters (mm).

When a transmitter coil and a receiver coil are located in a region in which communication cannot be performed, relative positions between the transmitter coil and the receiver coil may be determined by using a self-inductance L1 of the transmitter coil, or relative positions between the transmitter coil and the receiver coil may be determined by using a product of a self-inductance and an alternating current resistance of the transmitter coil.

On the basis of the wireless charging device provided in the foregoing embodiments, the embodiments of this application further provide a wireless charging dock, which is described in detail below with reference to the accompanying drawings.

Wireless Charging Dock Embodiment

A wireless charging dock is configured to wirelessly charge an electronic device. For example, the electronic device may be a mobile phone or a wearable device. When the electronic device is a mobile phone and the wireless charging dock charges the mobile phone, the wireless charging dock is horizontally placed on a desktop, and the mobile phone is horizontally placed on the wireless charging dock. Because the wireless charging dock is provided with a transmitter coil and the mobile phone is provided with a receiver coil, the transmitter coil may be coupled to the receiver coil by using an electromagnetic field, to transfer energy and wirelessly charge the mobile phone. The wireless charging dock provided in this embodiment of this application may be a one-to-many dock or a one-to-one dock. This is not specifically limited in this embodiment of this application. When the wireless charging dock is a one-to-many dock, the dock may be a planar structure or a three-dimensional structure. This is not specifically limited.

The wireless charging dock provided in this embodiment is configured to wirelessly charge the electronic device, and includes: a power interface, a resonant network, an inverter circuit, a controller, at least two detection coils, a transmitter coil chassis, and an alignment rail.

Still refer to FIG. 1. The wireless charging dock is 02, the power interface of the wireless charging dock 02 is connected to the adapter 40, and the adapter 40 converts mains into a direct current and provides the direct current to the wireless charging dock 02.

The power interface is configured to connect to a direct current transmitted by the adapter.

The adapter is configured to: convert alternating current mains into a direct current, and supply the direct current to the power interface, for example, convert the alternating current mains 220 V into a direct current.

The resonant network includes a resonant capacitor and a transmitter coil.

The transmitter coil chassis is configured to carry the transmitter coil.

An input terminal of the inverter circuit is configured to connect to the power interface, and an output terminal of the inverter circuit is configured to connect to the resonant network.

The at least two detection coils are located on a side of a plane on which the transmitter coil is located, and a plane on which the detection coils are located is parallel to the plane on which the transmitter coil is located.

The controller is configured to: separately control the at least two detection coils to sequentially connect to an excitation power source, obtain parameters of the detection coils connected to the excitation power source, and control, based on a value difference between the parameters of the at least two detection coils, the transmitter coil to move, so that the transmitter coil aligns with a receiver coil in the electronic device.

The wireless charging dock provided in this embodiment of this application is provided with a plurality of detection coils. When a position deviation between the transmitter coil in the wireless charging device and a receiver coil in the electronic device is large, the controller controls, by using parameters of the plurality of detection coils, the transmitter coil to move. Because the detection coils are disposed on a side closer to the electronic device, it is easier for the detection coils to detect the position of the receiver coil. The controller controls all the detection coils to sequentially connect to the excitation power source, and sequentially obtains the parameters of the detection coils connected to the excitation power source, thereby avoiding electromagnetic interference of the detection coils caused by simultaneous connections of all the detection coils to the excitation power source, and avoiding that the obtained parameters of the detection coils are inaccurate due to the electromagnetic interference. In addition, a plane on which the detection coils are located is parallel to a plane on which the transmitter coil is located, and the parameters of all the detection coils are obtained in a same condition, thereby facilitating comparison between the parameters of all the detection coils. The controller controls, based on the parameters of the detection coils, the transmitter coil to move, so that the transmitter coil aligns with the receiver coil in the electronic device. The wireless charging device provided in this embodiment of this application can implement automatic alignment. Therefore, when the electronic device is wirelessly charged, even if a position at which the electronic device is placed does not align with the transmitter coil exactly, the controller can still control the transmitter coil to move, so as to implement automatic alignment of the transmitter coil and the receiver coil, thereby improving charging flexibility and wireless charging experience of a user.

All the automatic alignment manners described in the foregoing wireless charging device embodiments are applicable to the wireless charging dock. Details are not described herein again. The advantages and effects of the foregoing embodiments are applicable to the wireless charging dock.

In addition, the wireless charging dock may further include an alignment mechanism. The controller may control the alignment mechanism to drive the transmitter coil to align with the receiver coil. For a specific schematic diagram and implementation, refer to the wireless charging device embodiments. Details are not described herein again. In addition, when the wireless charging device does not have an automatic alignment function, the wireless charging device may include a mechanical latching to implement alignment.

On the basis of the wireless charging device and the wireless charging dock that are provided in the foregoing embodiments, the embodiments of this application further provide an automatic alignment method for a transmitter coil used for wireless charging. Details are described below with reference to the accompanying drawings.

Method Embodiment 1

Figure 13:
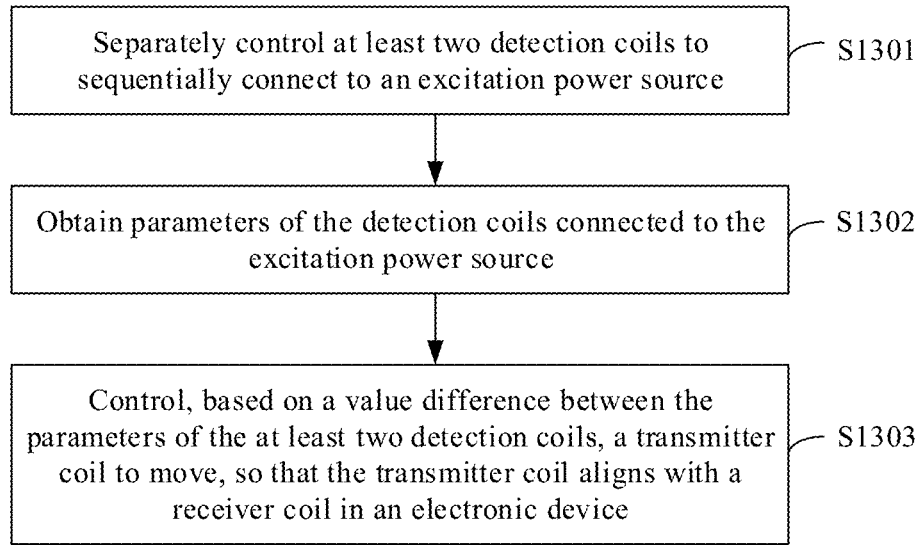
FIG. 13 is a flowchart of an automatic alignment method for a transmitter coil according to an embodiment of this application.

FIG. 13 is a flowchart of an automatic alignment method for a transmitter coil according to an embodiment of this application.

The automatic alignment method for a transmitter coil provided in this embodiment of this application is applied to a wireless charging device. The wireless charging device includes: a transmitter coil, a controller, and at least two detection coils. The at least two detection coils are symmetrically arranged about central axis of the transmitter coil in an upper direction of a plane on which the transmitter coil is located, and the upper direction is a side facing an electronic device. A plane on which the detection coils are located is parallel to the plane on which the transmitter coil is located. For a specific implementation of the wireless charging device, refer to the descriptions of the foregoing wireless charging device embodiments. Details are not described herein again.

It should be noted that, in this embodiment of this application, only a case in which the detection coils are symmetrically arranged is used as an example for description. The detection coils may alternatively be arranged in another manner. This is not specifically limited herein in this embodiment of this application. In this embodiment of this application, only the case in which the detection coils are arranged on the side facing the electronic device is used as an example for description. The detection coils may alternatively be arranged on another side. This is not specifically limited herein in this embodiment of this application.

The method includes the following steps.

S1301: Separately control the at least two detection coils to sequentially connect to an excitation power source.

A purpose of sequentially connecting rather than simultaneously connecting the detection coils in this embodiment of this application to the excitation power source is to avoid electromagnetic interference between the detection coils and avoid inaccurate obtained parameters of the detection coils caused by the electromagnetic interference.

In addition, in this embodiment of this application, the detection coils are symmetrically arranged on the upper direction of the plane on which the transmitter coil is located. A purpose of uniform and symmetrical arrangement is to enable the detection coils to cover a larger range and avoid a case in which the electronic device cannot be detected due to a small detection range.

In addition, in this embodiment of this application, the detection coils are disposed on the upper direction of the plane on which the transmitter coil is located, and the upper direction is the side facing the electronic device. The coils are disposed on the side closer to the electronic device, so that it can be easier to detect a position of a receiver coil. In this way, a case in which detection is inaccurate because the detection coils are disposed on a side far away from the electronic device is avoided.

In addition, in this embodiment of this application, a purpose of disposing the plane on which the detection coils are located parallel to the plane on which the transmitter coil is located is to make the obtained parameters of the detection coils facilitate comparison. In this way, the transmitter coil can align with the receiver coil more accurately based on the parameters of the detection coils.

The excitation power source is connected to the detection coils to supply power to the detection coils.

S1302: Obtain the parameters of the detection coils connected to the excitation power source.

When the detection coils are connected to the excitation power source, the controller may obtain the parameters of the detection coils, for example, self-inductances of the detection coils or products of self-inductances and alternating current resistances of the detection coils. When a detection coil can be coupled to the receiver coil, closer coupling between the detection coil and the receiver coil indicates a shorter distance and a larger self-inductance of the corresponding detection coil. In other words, some parameters of the detection coil are in a negative monotonous relationship with the distance. In this embodiment of this application, the position of the receiver coil is determined by using monotonous relationships between the parameters of the detection coils and distances.

Furthermore, in addition to some electrical parameters of the detection coils, the parameters of the detection coils may further include communication results. For example, after the plurality of detection coils are sequentially connected to the excitation power source, if it is found that only one detection coil can be coupled to the receiver coil, it indicates that the detection coil that can implement coupling is closest to the receiver coil. In this case, the transmitter coil is moved to a position of the detection coil that can implement coupling.

S1303: Control, based on a value difference between the parameters of the at least two detection coils, the transmitter coil to move, so that the transmitter coil aligns with the receiver coil in the electronic device.

Because the position of the receiver coil may be indirectly obtained by using the parameters of the detection coils, the parameters of the detection coils are used to control the transmitter coil to move to a position of a corresponding detection coil, so that the transmitter coil L1 can automatically align with the receiver coil.

A quantity of detection coils is not specifically limited herein in this embodiment of this application, and may be set by a person skilled in the art based on an actual condition, for example, may be set to two, three, four, or more detection coils. To make a range covered by the detection coils bigger and more uniform, the quantity of detection coils may be set based on a size of the transmitter coil and a movable range that can be covered, so that the detection coils cover the range corresponding to the transmitter coil as evenly as possible.

In addition, a shape and a size of each detection coil are not limited in this embodiment of this application either. For ease of detection and simplification of a process, it may be set that sizes and shapes of all detection coils are consistent. Shapes of the detection coils are not specifically limited in this embodiment of this application either, for example, may be circles or regular polygons such as regular quadrangles, regular pentagons, or regular hexagons.

In addition, a specific quantity of turns of the detection coils is not limited in this embodiment of this application either, for example, may be one turn of coil, or may be a plurality of turns of coils. In other words, the detection coils include at least one turn of coil of a preset shape, and the preset shape may be the circle or the regular polygon described above. For example, to save a material and facilitate a layout, the detection coil may be provided with only one turn of coil.

In a space layout, a position relationship between the plurality of detection coils is not limited in this embodiment of this application either. For example, two neighboring detection coils may be in contact, in other words, there is a common point or a common line, that is, a contact portion has no gap. For example, when the plurality of detection coils are circles of same sizes, two neighboring circles may be tangent, that is, are in contact. When the plurality of detection coils are squares of same sizes, two neighboring squares share one side, that is, are in contact.

In addition, any two neighboring detection coils may alternatively be spaced by a preset distance. A specific value of the preset distance is not limited in this embodiment of this application, and may be set based on a size of the transmitter coil and sizes of the detection coils. When two neighboring detection coils are in contact, a charging range that can be covered by the transmitter coil may be small, but a detection dead zone between the detection coils is also smaller, and movement control over the transmitter coil is easier.

When two neighboring detection coils are spaced by the preset distance, that is, a gap exists between the two neighboring detection coils, the charging range that can be covered by the transmitter coil can be expanded, but the detection dead zone between the detection coils may also be larger, and movement control over the transmitter coil is more complex.

In addition, the transmitter coil in the wireless charging device provided in this embodiment of this application can move. Whether the detection coils can move is not limited in this embodiment of this application. For example, the detection coils may move with the transmitter coil. In this case, installation manners of the detection coils and impact on movable space of the transmitter coil need to be considered.

In addition, the detection coils may alternatively be fastened, in other words, when the transmitter coil moves, all the detection coils are stationary. When all the detection coils are stationary, for example, the detection coils may be fastened to a housing the transmit terminal and do not move with the transmitter coil. In this case, the transmitter coil and the detection coils are separately disposed. For this case, because the detection coils are fastened, movement space of the detection coils does not need to be considered, thereby facilitating expansion of a detection region and implementing a charging plane with a larger range.

This embodiment of this application provides an automatic alignment method for a transmitter coil and a plurality of detection coils are disposed. When a position deviation between the transmitter coil in the wireless charging device and the receiver coil in the electronic device is large, the controller controls, by using the parameters of the plurality of detection coils, the transmitter coil to move. Because the detection coils are disposed on a side closer to the electronic device, it is easier for the detection coils to detect the position of the receiver coil. The controller controls all the detection coils to sequentially connect to the excitation power source, and sequentially obtains the parameters of the detection coils connected to the excitation power source, thereby avoiding electromagnetic interference of the detection coils caused by simultaneous connections of all the detection coils to the excitation power source, and avoiding that the obtained parameters of the detection coils are inaccurate due to the electromagnetic interference. In addition, a plane on which the detection coils are located is parallel to a plane on which the transmitter coil is located, and the parameters of all the detection coils are obtained in a same condition, thereby facilitating comparison between the parameters of all the detection coils. The controller controls, based on the parameters of the detection coils, the transmitter coil to move, so that the transmitter coil aligns with the receiver coil in the electronic device. The wireless charging device provided in this embodiment of this application can implement automatic alignment. Therefore, when the electronic device is wirelessly charged, even if a position at which the electronic device is placed does not align with the transmitter coil exactly, the controller can still control the transmitter coil to move, so as to implement automatic alignment of the transmitter coil and the receiver coil, thereby improving charging flexibility and wireless charging experience of a user.

Method Embodiment 2

Figure 14:
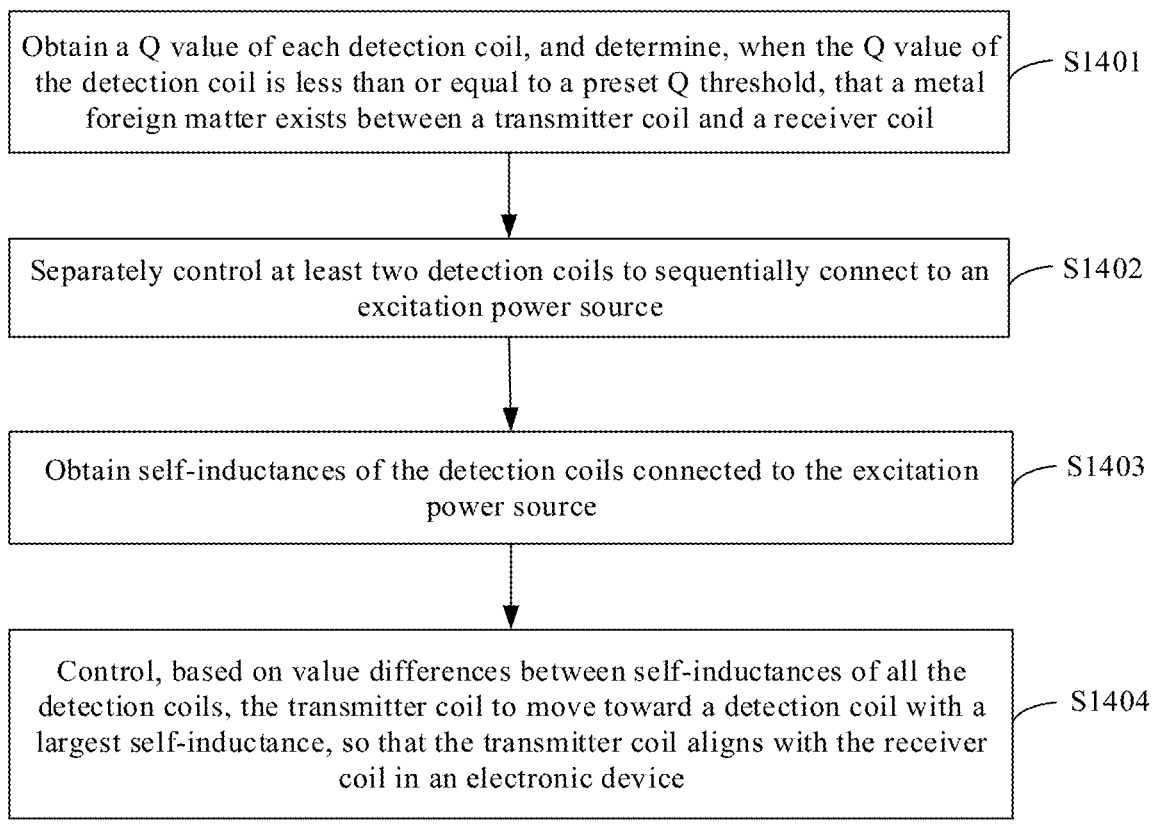
FIG. 14 is a flowchart of another automatic alignment method for a transmitter coil according to an embodiment of this application.

FIG. 14 is a flowchart of an automatic alignment method for a transmitter coil according to an embodiment of this application.

On the basis of Embodiment 1 of the automatic alignment method for a transmitter coil, a foreign matter may exist between the wireless charging device and the electronic device. Therefore, before wireless charging is performed, a foreign matter detection process may further be included. For example, the foreign matter could be a metal matter. A changing magnetic field generated between a transmitter coil and a receiver coil generates an eddy current loss and heat on the metal foreign matter.

S1401: Obtain a Q value of each detection coil, and determine, when the Q value of the detection coil is less than or equal to a preset Q threshold, that a metal foreign matter exists between the transmitter coil and the receiver coil.

It should be understood that an obtaining principle of the Q value of the detection coil is similar to that of a Q value of the transmitter coil. Details are not described herein again.

In this case, to prevent the metal foreign matter from affecting wireless charging, the metal foreign matter may be removed first before wireless charging is performed.

S1402: Separately control at least two detection coils to sequentially connect to an excitation power source.

S1403: Obtain self-inductances of the detection coils connected to the excitation power source, or obtain products of self-inductances and alternating current resistances of the detection coils connected to the excitation power source. In this embodiment, an example in which the self-inductances of the detection coils are obtained is used for description.

S1404: Control, based on value differences between self-inductances of all the detection coils, the transmitter coil to move toward a detection coil with a largest self-inductance, so that the transmitter coil aligns with the receiver coil in the electronic device.

When parameters of the detection coils are the products of the self-inductances and the alternating current resistances of the detection coils, the transmitter coil is controlled, based on the self-inductance and the alternating current resistance of each detection coil, to move toward a detection coil with a largest product of a self-inductance and an alternating current resistance, so that the transmitter coil aligns with the receiver coil in the electronic device.

In this embodiment of this application, the obtained parameters of the detection coils connected to the excitation power source may include the self-inductances. The detection coils are sequentially connected to the excitation power source, and the self-inductances corresponding to all the detection coils are obtained. The transmitter coil is controlled, based on the self-inductances of all the detection coils, to move toward a detection coil with a largest self-inductance.

Similarly, when the parameters of the detection coils obtained by the controller are the self-inductances and the alternating current resistances of all the detection coils, the controller may control the transmitter coil to move toward a detection coil with a largest product of a self-inductance and an alternating current resistance.

In the automatic alignment method for a transmitter coil provided in this embodiment of this application, a standard for the controller to control the transmitter coil to move is the self-inductances of the detection coils or the products of the self-inductances and the alternating current resistances, and the transmitter coil is moved toward the detection coil with the largest self-inductance or toward the detection coil with the largest product of the self-inductance and the alternating current resistance. Because when a detection coil is close to the receiver coil, the detection coil generates an electromagnetic field under an action of the excitation power source, and the receiver coil also induces the electromagnetic field. When a distance between the detection coil and the receiver coil is less than a preset distance threshold, the detection coil is electromagnetically coupled to the receiver coil. A shorter distance between a detection coil and the receiver coil indicates closer coupling between the detection coil and the receiver coil and a larger self-inductance of the corresponding detection coil. In other words, the self-inductance of the detection coil is in a negative monotonous relationship with the distance. In this case, the detection coil with the largest self-inductance is closest to the receiver coil, and the transmitter coil is moved toward a region corresponding to the detection coil with the largest self-inductance, to implement alignment of the transmitter coil aligns and the receiver coil. It should be understood that when the transmitter coil is close to the receiver coil, wireless communication may be performed, and further, wireless charging may be performed.

A region covered by the plurality of detection coils provided in this embodiment of this application is greater than a region covered by the transmitter coil. Therefore, a coupling status between the detection coil and the receiver coil may be used to control the transmitter coil to move. In other words, alignment of the transmitter coil and the receiver coil is indirectly implemented by using the detection coils.

In the automatic alignment method for a transmitter coil provided in the foregoing embodiment, the self-inductances of the detection coils or the products of the self-inductances and the alternating current resistances of the detection coils are used to determine a position of the receiver coil, so as to implement automatic alignment of the transmitter coil and the receiver coil. In addition, the parameters obtained by the controller may alternatively be communication results between all the detection coils and the receiver coil. The transmitter coil is controlled, based on the communication results, to move toward a detection coil corresponding to a communication result being a success. Details are described below with reference to the accompanying drawings.

Method Embodiment 3 of Automatic Alignment Method for Transmitter Coil

Figure 15:
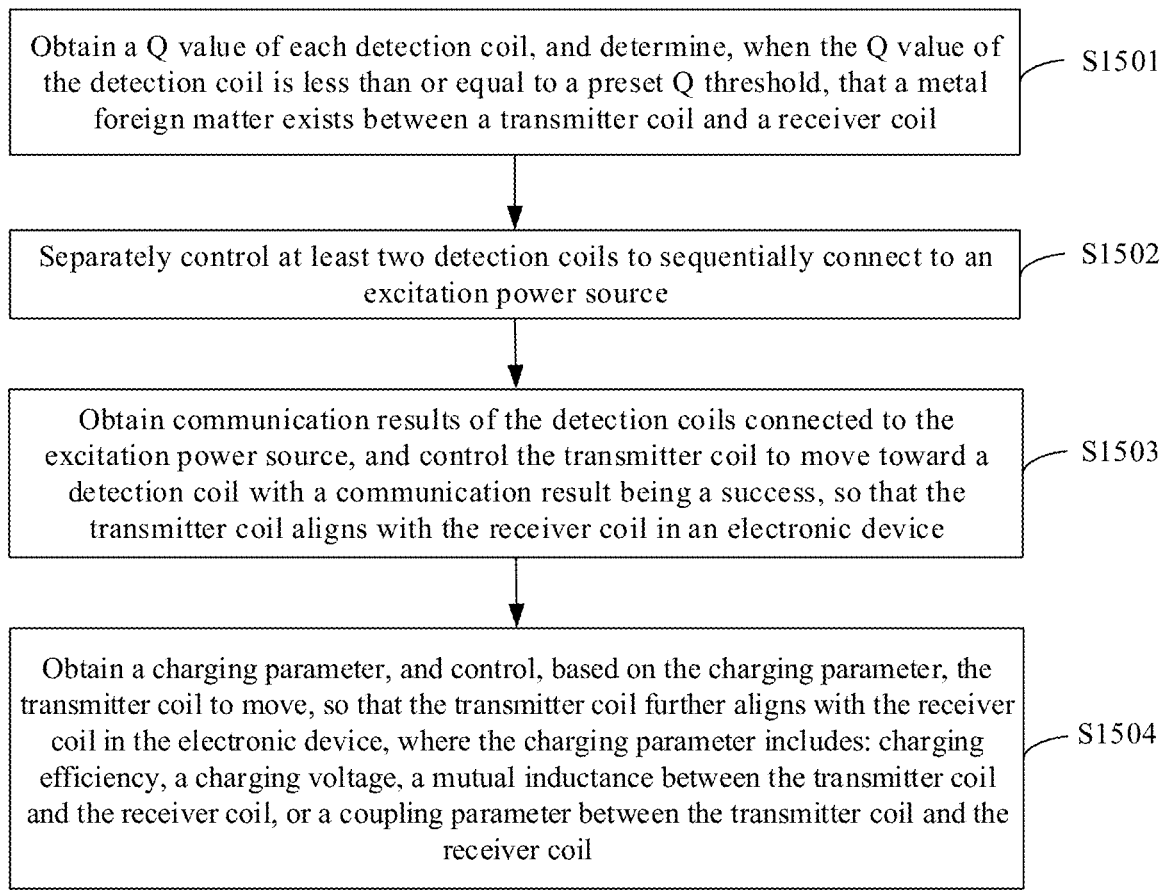
FIG. 15 is a flowchart of still another automatic alignment method for a transmitter coil according to an embodiment of this application.

FIG. 15 is a flowchart of an automatic alignment method for a transmitter coil according to an embodiment of this application.

In this embodiment of this application, parameters obtained by a controller may be communication results between all detection coils and a receiver coil. A transmitter coil is controlled to move toward a detection coil corresponding to a communication result being a success.

S1501: Obtain a Q value of each detection coil, and determine, when the Q value of the detection coil is less than or equal to a preset Q threshold, that a metal foreign matter exists between the transmitter coil and the receiver coil.

To prevent the metal foreign matter from affecting wireless charging, the metal foreign matter may be removed first before wireless charging is performed.

S1502: Separately control at least two detection coils to sequentially connect to an excitation power source.

S1503: Obtain communication results of the detection coils connected to the excitation power source, and control the transmitter coil to move toward the detection coil with the communication result being a success, so that the transmitter coil aligns with the receiver coil in an electronic device.

The foregoing embodiments show merely the case in which the transmitter coil is roughly adjusted to implement automatic alignment of the transmitter coil and the receiver coil. In addition, the transmitter coil may be finely adjusted to further implement more accurate alignment of the transmitter coil and the receiver coil.

S1504: Obtain at least one of the following parameters of a wireless charging device: working frequency, a self-inductance of the transmitter coil, an alternating current resistance of the transmitter coil, a current of the transmitter coil, or an input voltage of the transmitter coil; and control, based on the at least one parameter, the transmitter coil to move, so that the transmitter coil further aligns with the receiver coil in the electronic device.

Alternatively, in this embodiment, an example in which the controller obtains a charging parameter of the wireless charging device is used for description.

S1504: Obtain the charging parameter, and control, based on the charging parameter, the transmitter coil to move, so that the transmitter coil further aligns with the receiver coil in the electronic device, where the charging parameter includes: charging efficiency, a charging voltage, a mutual inductance between the transmitter coil and the receiver coil, or a coupling parameter between the transmitter coil and the receiver coil.

S1504: Obtain the charging parameter, and control, based on the charging parameter, the transmitter coil to move, so that the transmitter coil further aligns with the receiver coil in the electronic device, where the charging parameter further includes a mutual inductance between the transmitter coil and an auxiliary coil or a coupling parameter between the transmitter coil and an auxiliary coil.

Method Embodiment 4 of Automatic Alignment Method for Transmitter Coil

Figure 16A:
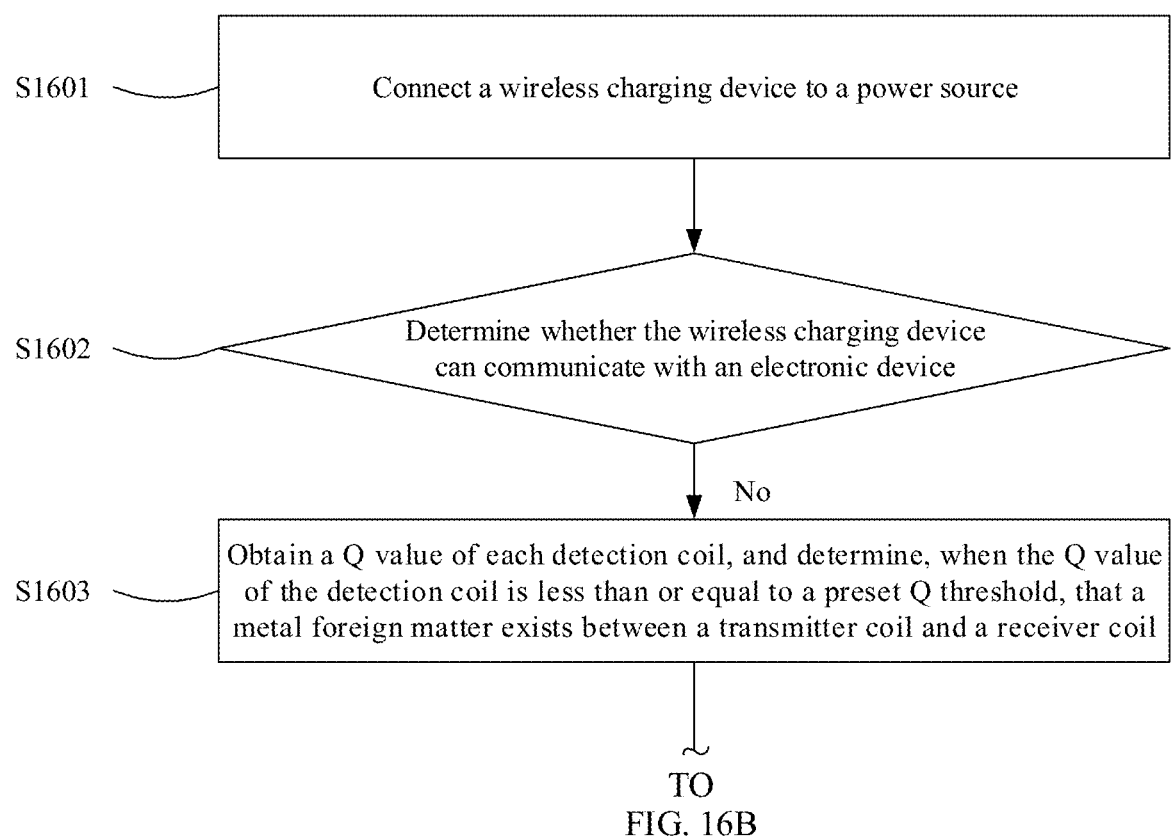
FIG. 16A to FIG. 16C are a flowchart of yet another automatic alignment method for a transmitter coil according to an embodiment of this application.
Figure 16B:
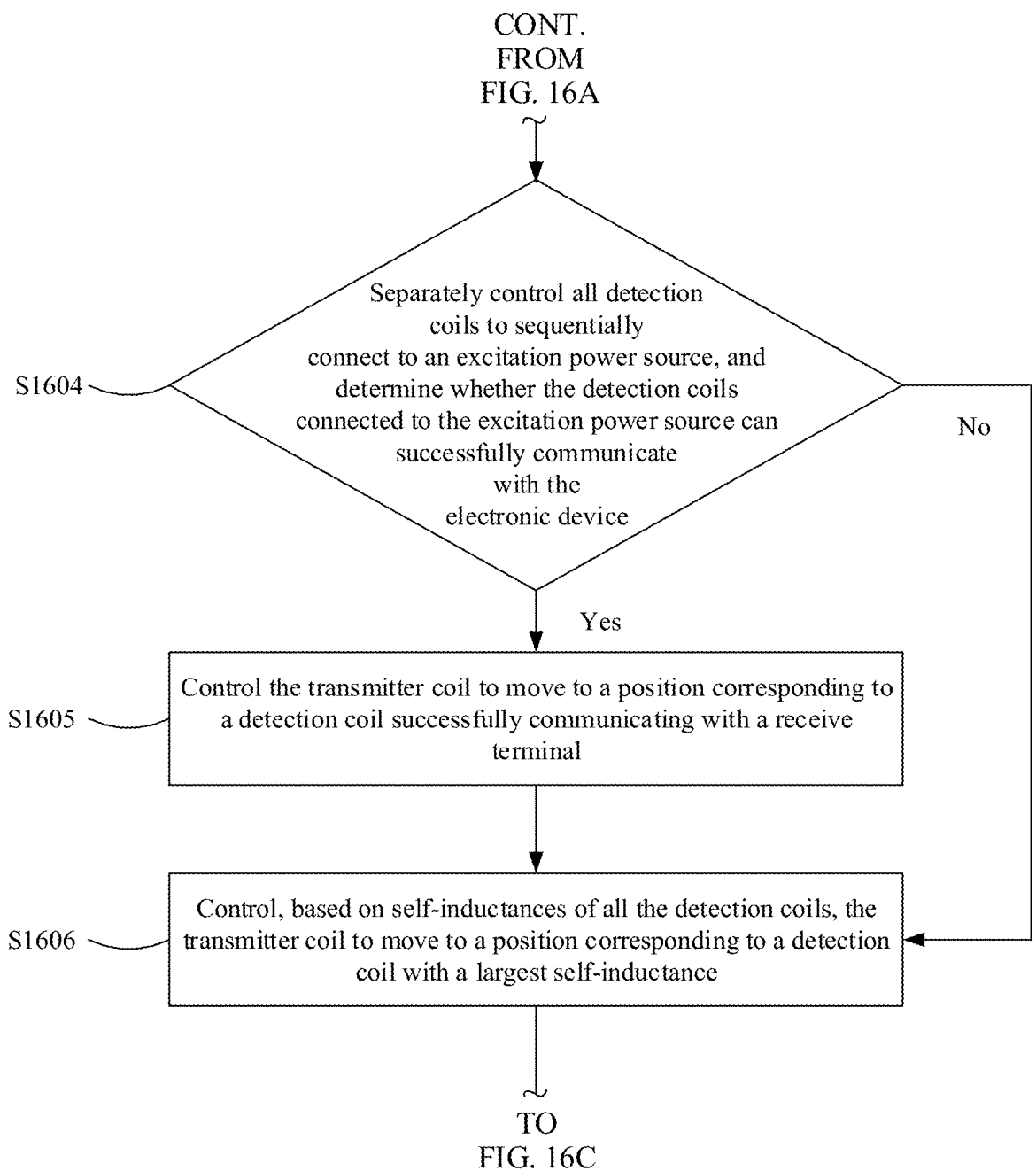
Figure 16C:
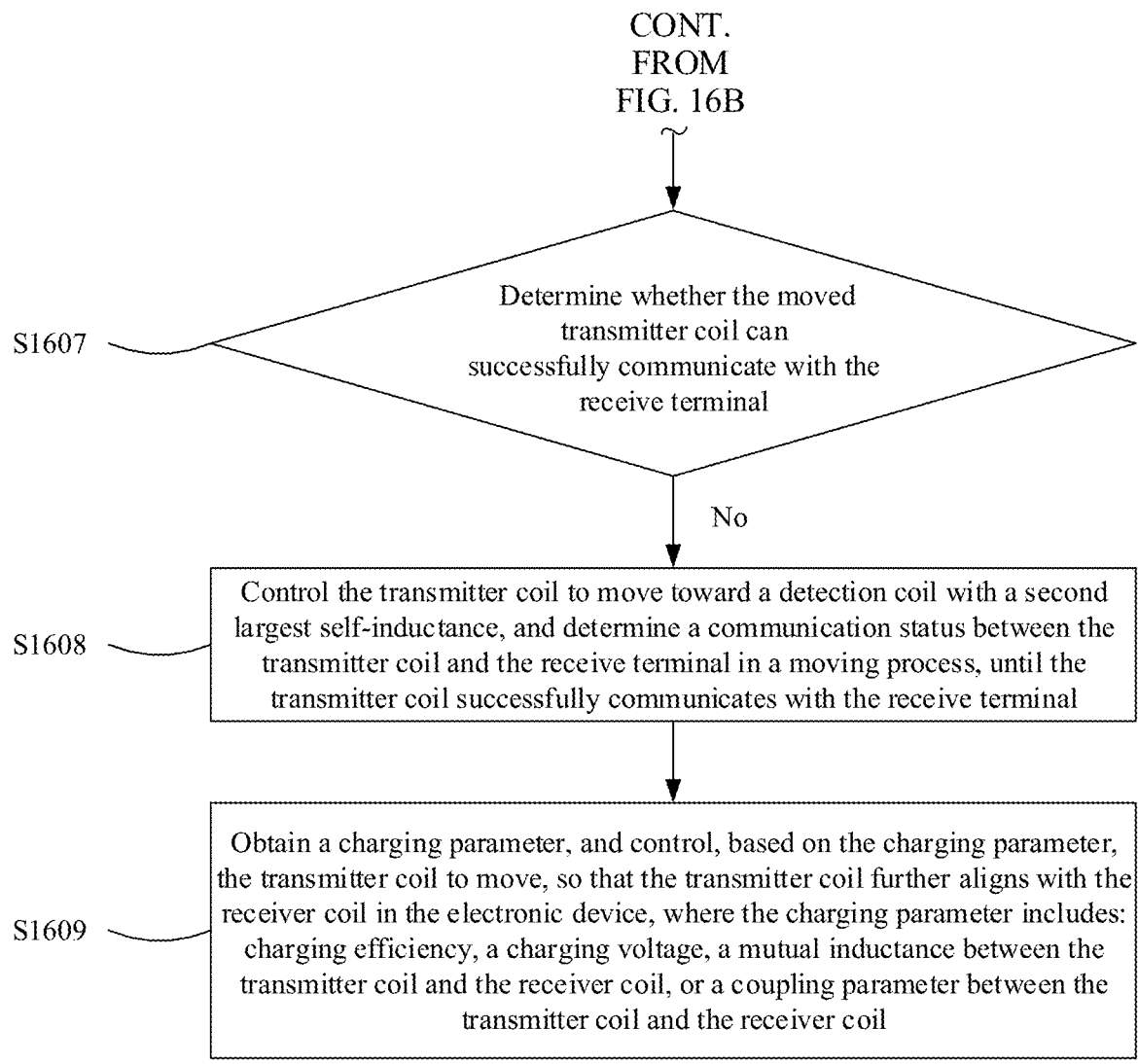

FIG. 16A to FIG. 16C are a flowchart of an automatic alignment method for a transmitter coil according to an embodiment of this application.

S1601: Connect the wireless charging device to a power source.

S1602: Determine whether the wireless charging device can communicate with an electronic device.

If the wireless charging device can communicate with the electronic device, it indicates that the transmitter coil has aligned with a receiver coil, and a subsequent step does not need to be performed.

S1603: Obtain a Q value of each detection coil, and determine, when the Q value of the detection coil is less than or equal to a preset Q threshold, that a metal foreign matter exists between the transmitter coil and the receiver coil.

To prevent the metal foreign matter from affecting wireless charging, the metal foreign matter may be removed first before wireless charging is performed.

S1604: Separately control all detection coils to sequentially connect to an excitation power source, and determine whether the detection coils connected to the excitation power source can successfully communicate with the electronic device.

S1605: Control the transmitter coil to move to a position corresponding to a detection coil successfully communicating with a receive terminal.

S1606: Control, based on self-inductances of all the detection coils, the transmitter coil to move to a position corresponding to a detection coil with a largest self-inductance.

S1607: Determine whether the moved transmitter coil can successfully communicate with the receive terminal.

S1608: Control the transmitter coil to move toward a detection coil with a second largest self-inductance, and determine a communication status between the transmitter coil and the receive terminal in a moving process, until the transmitter coil successfully communicates with the receive terminal.

In this embodiment, an example in which the transmitter coil is controlled to move toward the detection coil successfully communicating with the receive terminal is used for description. In addition, the transmitter coil may alternatively be controlled, based on the parameters in S1403 in Method Embodiment 2, to move. Details are not described herein in this embodiment again.

The foregoing steps show merely the case in which the transmitter coil is roughly adjusted to implement automatic alignment of the transmitter coil and the receiver coil. In addition, the transmitter coil may be finely adjusted to further implement more accurate alignment of the transmitter coil and the receiver coil.

S1609: Obtain a charging parameter, and control, based on the charging parameter, the transmitter coil to move, so that the transmitter coil further aligns with the receiver coil in the electronic device, where the charging parameter includes: charging efficiency, a charging voltage, a mutual inductance between the transmitter coil and the receiver coil, or a coupling parameter between the transmitter coil and the receiver coil.

In this embodiment, an example in which a controller obtains the charging parameter of the wireless charging device is used for description. In addition, to implement further alignment of the transmitter coil and the receiver coil, other parameters in S1504 in Method Embodiment 3 may further be obtained.

In addition, in Method Embodiment 2, the transmitter coil may alternatively be controlled to move toward the detection coil with the second largest self-inductance a plurality of times, so that the transmitter coil aligns with the receiver coil in the electronic device. This is not specifically limited herein in this embodiment.

Figure 17:
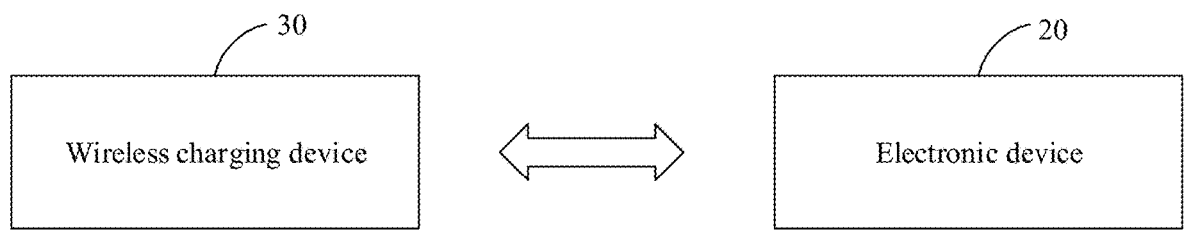
FIG. 17 is a schematic diagram of a wireless charging system according to an embodiment of this application.

FIG. 17 is a schematic diagram of a wireless charging system according to an embodiment of this application.

The wireless charging system provided in this embodiment of this application includes the wireless charging device 30 described in the foregoing embodiment, and further includes an electronic device 20.

The electronic device 20 includes a receiver coil and a rectifier circuit. For a structure of the electronic device, refer to FIG. 2.

The wireless charging device 30 is configured to wirelessly charge the electronic device 20.

The wireless charging device 30 may be a wireless charging dock. The electronic device 20 may be a mobile phone or a wearable device. The wearable device may be, for example, a watch.

In the wireless charging system provided in this embodiment of this application, when a position deviation between a transmitter coil in the wireless charging device and the receiver coil in the electronic device is large, a plurality of detection coils disposed on a transmit terminal of the wireless charging device are used to control the transmitter coil to move. The detection coils are symmetrically arranged. The symmetrical arrangement may enable the detection coils to cover a larger range. In addition, the detection coils are disposed on a side closer to the electronic device, so that the detection coils can detect a position of the receiver coil more easily. The controller controls all the detection coils to sequentially connect to an excitation power source, and sequentially obtains parameters of the detection coils connected to the excitation power source, thereby avoiding electromagnetic interference of the detection coils caused by simultaneous connections of all the detection coils to the excitation power source, and avoiding that the obtained parameters of the detection coils are inaccurate due to the electromagnetic interference. In addition, a plane on which the detection coils are located is parallel to a plane on which the transmitter coil is located, so that the obtained parameters of the detection coils connected to the excitation power source are uniform, thereby facilitating central comparison between the parameters of all the detection coils. The transmitter coil is controlled, based on the parameters of the detection coils, to move, so that the transmitter coil is moved to a position aligning with the receiver coil in the electronic device. Even if a user has not aligned the receiver coil in the electronic device with the transmitter coil in the wireless charging device when placing the electronic device on the wireless charging device, automatic alignment of the transmitter coil in the wireless charging device and the receiver coil in the electronic device can still be implemented, thereby improving charging flexibility.

It should be understood that, in the embodiments of this application, "at least one (item)" means one or more, and "a plurality of" means two or more. The term "and/or" is used to describe an association relationship between associated objects, and represents that three relationships may exist. For example, "A and/or B" may represent the following three cases: Only A exists, only B exists, and both A and B exist, where A and B may be singular or plural. The character "/" usually represents an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent a, b, c, "a and b", "a and c", "b and c", or "a, b, and c", where a, b, and c may be singular or plural.

The foregoing descriptions are merely embodiments of the embodiments of this application, and are not intended to limit the embodiments of this application in any form. Although the embodiments of this application have been disclosed above as embodiments, the foregoing embodiments of this application are not intended to limit the embodiments of this application. Any person skilled in the art may make many possible changes and modifications to the technical solutions in the embodiments of this application by using the foregoing disclosed methods and technical content, or modify the technical solutions to equivalent embodiments with equivalent changes without departing from the scope of the technical solutions of the embodiments of this application. Therefore, any simple modification and equivalent change or modification made to the foregoing embodiments based on the technical essence of the embodiments of this application without departing from the content of the technical solutions in the embodiments of this application still fall within the protection scope of the technical solutions in the embodiments of this application.

What is claimed is:

1. A wireless charging device, wherein the wireless charging device is configured to wirelessly charge an electronic device, and the wireless charging device comprises: a transmitter coil, a controller, and at least two detection coils;
   wherein the at least two detection coils are located on a side of a plane on which the transmitter coil is located, and a plane on which the at least two detection coils are located is parallel to the plane on which the transmitter coil is located; and
   wherein the controller is configured to:
      separately control the at least two detection coils to sequentially connect to an excitation power source;
      obtain parameters of the at least two detection coils connected to the excitation power source; and
      control, based on a value difference between the parameters of the at least two detection coils, the transmitter coil to move so that the transmitter coil aligns with a receiver coil in the electronic device;
   wherein the parameters comprise self-inductances and alternating current resistances; and
   wherein when the controller obtains the parameters and controls the transmitter coil to move, the controller is specifically configured to:
      obtain self-inductances and alternating current resistances of all the detection coils; and
      control, based on value differences between the self-inductances and the alternating current resistances of all the detection coils, the transmitter coil to move toward a detection coil with a largest product of a self-inductance and an alternating current resistance among the at least two detection coils.

2. The wireless charging device according to claim 1, wherein the parameters further comprise communication results, and the communication results are used to indicate whether the detection coils successfully communicate with the receiver coil; and
   wherein when the controller obtains the parameters and controls the transmitter coil to move, the controller is specifically configured to:
      obtain communication results between all the detection coils and the receiver coil; and
      control, based on the communication results between all the detection coils and the receiver coil, the transmitter coil to move toward a detection coil corresponding to a communication result being a success.

3. The wireless charging device according to claim 1, wherein the at least two detection coils are symmetrically arranged about a central axis of the transmitter coil, there are four detection coils, and shapes and sizes of the four detection coils are consistent.

4. The wireless charging device according to claim 1, wherein any two neighboring detection coils are in contact.

5. The wireless charging device according to claim 1, wherein any two neighboring detection coils are spaced by a preset distance.

6. The wireless charging device according to claim 3, wherein the detection coils comprise at least one turn of coil of a preset shape, and the preset shape is a circle or a regular polygon.

7. The wireless charging device according to claim 1, further comprising a plurality of switching circuits;
   wherein the plurality of switching circuits are connected between the excitation power source and the at least two detection coils; and
   wherein the controller is specifically configured to control switching actions in the plurality of switching circuits, so that the at least two detection coils are sequentially connected to the excitation power source.

8. The wireless charging device according to claim 1, wherein the at least two detection coils move with the transmitter coil.

9. The wireless charging device according to claim 1, wherein the at least two detection coils remain stationary.

10. The wireless charging device according to claim 1, wherein the controller is further configured to:
    obtain at least one of the following parameters of the wireless charging device: working frequency, a self-inductance of the transmitter coil, an alternating current resistance of the transmitter coil, a current of the transmitter coil, or an input voltage of the transmitter coil; and
    control, based on the at least one parameter, the transmitter coil to move so that the transmitter coil further aligns with the receiver coil in the electronic device.

11. The wireless charging device according to claim 1, wherein the controller is further configured to:
    obtain a charging parameter; and
    control, based on the charging parameter, the transmitter coil to move so that the transmitter coil further aligns with the receiver coil in the electronic device; and
    wherein the charging parameter comprises: charging efficiency, a charging voltage, a mutual inductance between the transmitter coil and the receiver coil, or a coupling parameter between the transmitter coil and the receiver coil.

12. The wireless charging device according to claim 1, wherein the electronic device comprises an auxiliary coil, and the charging parameter further comprises a mutual inductance between the transmitter coil and the auxiliary coil or a coupling parameter between the transmitter coil and the auxiliary coil.

13. The wireless charging device according to claim 1, wherein the controller is further configured to:
obtain a Q value of each detection coil; and
when the Q value of the detection coil is less than or equal to a preset Q threshold, determine that a metal foreign matter exists between the transmitter coil and the receiver coil.

14. The wireless charging device according to claim 1, further comprising an alignment mechanism, wherein
the controller is configured to control the alignment mechanism to drive the transmitter coil so that the transmitter coil aligns with the receiver coil.

15. The wireless charging device according to claim 1, wherein the controller is further configured to control the transmitter coil to return to an original position after the wireless charging device finishes charging the electronic device.

16. A wireless charging dock, configured to wirelessly charge an electronic device, the wireless charging dock comprising: a power interface, a resonant network, an inverter circuit, a controller, at least two detection coils, and a transmitter coil chassis, wherein:
the power interface is configured to connect to a direct current transmitted by an adapter;
the resonant network comprises a resonant capacitor and a transmitter coil;
the transmitter coil chassis is configured to carry the transmitter coil;
an input terminal of the inverter circuit is configured to connect to the power interface, and an output terminal of the inverter circuit is configured to connect to the resonant network;
the at least two detection coils are located on a side of a plane on which the transmitter coil is located, and a plane on which the at least two detection coils are located is parallel to the plane on which the transmitter coil is located; and
the controller is configured to:
separately control the at least two detection coils to sequentially connect to an excitation power source;
obtain parameters of the at least two detection coils connected to the excitation power source; and
control, based on a value difference between the parameters of the at least two detection coils, the transmitter coil to move so that the transmitter coil aligns with a receiver coil in the electronic device;
wherein the parameters comprise self-inductances and alternating current resistances; and
wherein when the controller obtains the parameters and controls the transmitter coil to move, the controller is specifically configured to:
obtain self-inductances and alternating current resistances of all the detection coils; and
control, based on value differences between the self-inductances and the alternating current resistances of all the detection coils, the transmitter coil to move toward a detection coil with a largest product of a self-inductance and an alternating current resistance among the at least two detection coils.

17. An automatic alignment method for a transmitter coil, applied to a wireless charging device, wherein the wireless charging device comprises: a transmitter coil, a controller, and at least two detection coils; and the at least two detection coils are located on a side of a plane on which the transmitter coil is located, and a plane on which the detection coils are located is parallel to the plane on which the transmitter coil is located; and the method comprises:
separately controlling the at least two detection coils to sequentially connect to an excitation power source;
obtaining parameters of the at least two detection coils connected to the excitation power source; and
controlling, based on a value difference between the parameters of the at least two detection coils, the transmitter coil to move so that the transmitter coil aligns with a receiver coil in an electronic device;
wherein the parameters comprise self-inductances and alternating current resistances; and
wherein the method further comprises:
obtaining self-inductances and alternating current resistances of all the detection coils; and
controlling, based on value differences between the self-inductances and the alternating current resistances of all the detection coils, the transmitter coil to move toward a detection coil with a largest product of a self-inductance and an alternating current resistance among the at least two detection coils.

* * * * *